US012805428B2

(12) United States Patent
Schaffert et al.

(10) Patent No.: US 12,805,428 B2
(45) Date of Patent: Nov. 24, 2026

(54) TRAILING ARM ASSEMBLY WITH COMPACT LINKAGE ASSEMBLY

(71) Applicant: SCHAFFERT MANUFACTURING COMPANY, INC., Indianola, NE (US)

(72) Inventors: Paul E. Schaffert, Indianola, NE (US); Kris Schaffert, Indianola, NE (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 611 days.

(21) Appl. No.: 18/202,818

(22) Filed: May 26, 2023

(65) Prior Publication Data

US 2023/0380333 A1 Nov. 30, 2023

Related U.S. Application Data

(60) Provisional application No. 63/346,758, filed on May 27, 2022.

(51) Int. Cl.
*A01C 7/20* (2006.01)
*A01C 5/06* (2006.01)

(52) U.S. Cl.
CPC .............. *A01C 7/208* (2013.01); *A01C 5/068* (2013.01)

(58) Field of Classification Search
CPC .. A01C 7/208; A01C 7/20; A01C 7/00; A01C 5/068; A01C 5/066; A01C 5/06; A01C 5/00
See application file for complete search history.

(56) References Cited

U.S. PATENT DOCUMENTS

| | | | |
|---|---|---|---|
| 13,683 | A | 10/1855 | Mccormick |
| 35,510 | A | 6/1862 | De Haven |
| 122,299 | A | 12/1871 | Wight et al. |
| 166,597 | A | 8/1875 | Evans |
| 176,708 | A | 4/1876 | Templin |
| 203,207 | A | 4/1878 | Springer |

(Continued)

FOREIGN PATENT DOCUMENTS

| | | | |
|---|---|---|---|
| AU | 2017399124 | A1 | 8/2019 |
| CA | 3052323 | A1 | 8/2018 |

(Continued)

OTHER PUBLICATIONS

AGCO, "Tye, Parts Catalog, 2015/2020 Rice and Soybean Drill EFF. S/N K-6-1367-10-RD," Jun. 1996, Form No. 79017760, Litho in U.S.A., 3 pages.

(Continued)

*Primary Examiner* — Tara Mayo
(74) *Attorney, Agent, or Firm* — Dorsey & Whitney LLP

(57) ABSTRACT

A linkage assembly for a trailing arm assembly includes a first coupling bracket configured for mounting to a planter or first sub-assembly of the trailing arm assembly, and a second coupling bracket configured for mounting with a second subassembly of the trailing arm assembly. The linkage assembly may further include a parallel linkage pivotally coupling the first coupling bracket and the second coupling bracket. The parallel linkage may be disposed on a center longitudinal plane of the linkage. The center longitudinal plane may bisect the first and second coupling bracket and the second coupling bracket. The linkage assembly may further include a biasing assembly coupled with the parallel linkage and manipulatable to selectively apply a down force to the second coupling bracket.

20 Claims, 22 Drawing Sheets

(56) References Cited

U.S. PATENT DOCUMENTS

| | | | |
|---|---|---|---|
| 211,601 | A | 1/1879 | Springer |
| 252,265 | A | 1/1882 | Scofield |
| 288,661 | A | 11/1883 | Purdy et al. |
| 308,327 | A | 11/1884 | Runstetler |
| 322,841 | A | 7/1885 | Miskimen |
| 555,897 | A | 3/1896 | Crane |
| 700,109 | A | 5/1902 | Wilkinson |
| 889,947 | A | 6/1908 | Miller |
| 907,278 | A | 12/1908 | Hammonds |
| 909,137 | A | 1/1909 | Bellerive |
| 952,447 | A | 3/1910 | Hammonds |
| 974,247 | A | 11/1910 | Douglass et al. |
| 1,059,534 | A | 4/1913 | Forrest |
| 1,377,073 | A | 5/1921 | Amon |
| 1,473,297 | A | 11/1923 | Knight |
| 1,483,789 | A | 2/1924 | Earhart |
| 1,498,378 | A | 6/1924 | Irwin |
| 2,039,166 | A | 4/1936 | Karl |
| 2,061,694 | A | 11/1936 | Cuddigan |
| 2,401,577 | A | 6/1946 | Melling |
| 2,533,374 | A | 12/1950 | Hyland |
| 2,601,591 | A | 6/1952 | Colombo |
| 2,668,490 | A | 2/1954 | Oehler et al. |
| 2,805,486 | A | 9/1957 | Barrett |
| 2,849,969 | A | 9/1958 | Taylor |
| 2,872,883 | A | 2/1959 | Padrick |
| 2,912,055 | A | 11/1959 | Cornelius et al. |
| 2,991,836 | A | 7/1961 | Le Roy |
| 3,115,192 | A | 12/1963 | Bushmeyer |
| 3,173,498 | A | 3/1965 | Harold |
| 3,177,830 | A | 4/1965 | Zimmerman |
| 3,212,585 | A | 10/1965 | Bezzerides |
| 3,306,371 | A | 2/1967 | Eugene |
| 3,336,885 | A | 8/1967 | Lebow |
| 3,599,729 | A | 8/1971 | Greemore |
| 3,666,572 | A | 5/1972 | Nakagawa et al. |
| 3,734,201 | A | 5/1973 | Zaun |
| 3,895,589 | A | 7/1975 | Garner et al. |
| 4,037,755 | A | 7/1977 | Reuter |
| 4,070,974 | A | 1/1978 | Stacy, Jr. |
| 4,108,089 | A | 8/1978 | Van Der Lely |
| 4,148,267 | A | 4/1979 | Bennett et al. |
| 4,253,412 | A | 3/1981 | Hogenson |
| 4,276,836 | A | 7/1981 | Pust |
| 4,294,181 | A | 10/1981 | Smith |
| 4,296,670 | A | 10/1981 | Northup et al. |
| 4,373,455 | A | 2/1983 | Friggstad |
| 4,398,478 | A | 8/1983 | Frase et al. |
| 4,407,207 | A | 10/1983 | Dreyer |
| 4,542,705 | A | 9/1985 | Orth |
| 4,565,141 | A | 1/1986 | Kopecky |
| 4,580,507 | A | 4/1986 | Dreyer et al. |
| 4,607,581 | A | 8/1986 | Kopecky |
| 4,628,841 | A | 12/1986 | Powilleit |
| 4,671,193 | A | 6/1987 | States |
| 4,674,419 | A | 6/1987 | Kopecky |
| 4,744,316 | A | 5/1988 | Lienemann et al. |
| 4,819,737 | A | 4/1989 | Frase |
| 4,834,189 | A | 5/1989 | Peterson et al. |
| 4,858,698 | A | 8/1989 | Williamson et al. |
| D305,337 | S | 1/1990 | Plummer |
| 4,911,090 | A | 3/1990 | Schimke |
| 5,000,270 | A | 3/1991 | Phillips |
| 5,078,528 | A | 1/1992 | Schmidt |
| 5,092,255 | A | 3/1992 | Long et al. |
| 5,163,518 | A | 11/1992 | Foley |
| 5,341,754 | A | 8/1994 | Winterton |
| 5,361,848 | A | 11/1994 | Fleischer et al. |
| 5,375,542 | A | 12/1994 | Schaffert |
| 5,398,771 | A | 3/1995 | Hornung et al. |
| 5,419,402 | A | 5/1995 | Heintzman |
| 5,425,318 | A | 6/1995 | Keeton |
| 5,443,023 | A | 8/1995 | Carroll |
| 5,461,995 | A | 10/1995 | Winterton |
| 5,497,836 | A | 3/1996 | Groff |
| 5,517,932 | A | 5/1996 | Ott et al. |
| 5,570,746 | A | 11/1996 | Jones et al. |
| D377,356 | S | 1/1997 | Bruns |
| 5,623,997 | A | 4/1997 | Rawson et al. |
| 5,626,196 | A | 5/1997 | Hughes |
| 5,628,372 | A | 5/1997 | Creyke |
| 5,640,915 | A | 6/1997 | Schaffert |
| 5,645,000 | A | 7/1997 | Carroll |
| D382,571 | S | 8/1997 | Bruns |
| 5,662,173 | A | 9/1997 | Blesing |
| 5,673,638 | A | 10/1997 | Keeton |
| D386,191 | S | 11/1997 | Bruns |
| 5,730,074 | A | 3/1998 | Peter |
| 5,732,780 | A | 3/1998 | Nikkel et al. |
| D395,662 | S | 6/1998 | Bruns |
| D396,863 | S | 8/1998 | Bruns |
| D399,215 | S | 10/1998 | Bruns |
| 5,852,982 | A | 12/1998 | Peter |
| 5,884,711 | A | 3/1999 | Shoup |
| 5,896,932 | A | 4/1999 | Bruns et al. |
| 5,904,107 | A | 5/1999 | Kester |
| 5,918,557 | A | 7/1999 | Schaffert |
| D412,711 | S | 8/1999 | Bruns |
| 5,970,891 | A | 10/1999 | Schlagel |
| 5,996,514 | A | 12/1999 | Arriola et al. |
| 6,082,274 | A | 7/2000 | Peter |
| 6,082,275 | A | 7/2000 | Schaffert |
| 6,119,608 | A | 9/2000 | Peterson et al. |
| 6,148,747 | A | 11/2000 | Deckler et al. |
| D440,985 | S | 4/2001 | Noonan et al. |
| 6,209,466 | B1 | 4/2001 | Wodrich |
| 6,220,191 | B1 | 4/2001 | Peter |
| 6,283,050 | B1 | 9/2001 | Schaffert |
| 6,314,897 | B1 | 11/2001 | Hagny |
| 6,321,667 | B1 | 11/2001 | Shoup |
| 6,453,832 | B1 | 9/2002 | Schaffert |
| 6,454,019 | B1 | 9/2002 | Prairie et al. |
| 6,530,334 | B2 | 3/2003 | Hagny |
| 6,640,732 | B2 | 11/2003 | Prairie et al. |
| 6,763,773 | B2 | 7/2004 | Schaffert |
| 6,918,343 | B2 | 7/2005 | Kester |
| 7,121,216 | B2 | 10/2006 | Schaffert |
| 7,246,563 | B2 | 7/2007 | Kester |
| 7,322,302 | B1 | 1/2008 | Reidhar |
| 7,360,495 | B1 | 4/2008 | Martin |
| 7,401,561 | B1 | 7/2008 | Kurz |
| 7,410,005 | B2 | 8/2008 | Lung et al. |
| 7,520,338 | B2 | 4/2009 | Stokes |
| D594,477 | S | 6/2009 | Dawson et al. |
| 7,552,689 | B2 | 6/2009 | Schaffert |
| 7,581,503 | B2 | 9/2009 | Martin |
| D611,507 | S | 3/2010 | Martin |
| 7,707,952 | B2 | 5/2010 | Schaffert |
| 7,730,961 | B2 | 6/2010 | Ward et al. |
| 7,975,629 | B1 | 7/2011 | Martin |
| D648,355 | S | 11/2011 | Lee |
| 8,047,301 | B2 | 11/2011 | Friggstad et al. |
| D663,326 | S | 7/2012 | Allensworth et al. |
| 8,267,021 | B2 | 9/2012 | Mariman et al. |
| 8,291,992 | B2 | 10/2012 | De Bree |
| 8,291,998 | B1 | 10/2012 | Berg et al. |
| 8,333,161 | B2 | 12/2012 | Arnett et al. |
| 8,343,291 | B1 | 1/2013 | Loen et al. |
| 8,356,563 | B2 | 1/2013 | Schaffert et al. |
| 8,359,988 | B2 | 1/2013 | Bassett |
| 8,397,612 | B2 | 3/2013 | Koplin et al. |
| 8,544,398 | B2 | 10/2013 | Bassett |
| 8,555,798 | B2 | 10/2013 | Friggstad et al. |
| D699,267 | S | 2/2014 | Nelson |
| 8,863,857 | B2 | 10/2014 | Bassett |
| 8,910,581 | B2 | 12/2014 | Bassett |
| 8,910,582 | B2 | 12/2014 | Mariman et al. |
| 8,939,095 | B2 | 1/2015 | Freed |
| D727,975 | S | 4/2015 | Brockway |
| D727,976 | S | 4/2015 | Brockway |
| 9,107,337 | B2 | 8/2015 | Bassett |
| 9,204,590 | B2 | 12/2015 | Schaffert et al. |
| 9,232,689 | B2 | 1/2016 | Trevino et al. |
| 9,365,996 | B2 | 6/2016 | Brockway |

(56) References Cited

U.S. PATENT DOCUMENTS

| | | | |
|---|---|---|---|
| 9,516,803 | B1 | 12/2016 | Rosenboom |
| 9,681,599 | B2 | 6/2017 | Whalen et al. |
| 10,060,467 | B2 | 8/2018 | Schaffert et al. |
| D844,675 | S | 4/2019 | Schaffert |
| D849,800 | S | 5/2019 | Hansen et al. |
| 10,383,274 | B2 | 8/2019 | Whalen et al. |
| 10,624,252 | B2 | 4/2020 | Nance |
| D883,345 | S | 5/2020 | Schaffert |
| 10,798,870 | B2 | 10/2020 | Schaffert et al. |
| 10,830,274 | B2 | 11/2020 | Schaffert et al. |
| 10,986,772 | B2 | 4/2021 | Andres |
| 11,266,063 | B2 | 3/2022 | Schaffert et al. |
| 11,477,931 | B2 | 10/2022 | Hake et al. |
| 2002/0078869 | A1 | 6/2002 | Brummelhuis |
| 2003/0051650 | A1 | 3/2003 | Engelke et al. |
| 2005/0072344 | A1 | 4/2005 | Kester |
| 2005/0155536 | A1 | 7/2005 | Wendte et al. |
| 2007/0113763 | A1 | 5/2007 | Schaffert |
| 2007/0278272 | A1 | 12/2007 | Fast |
| 2008/0011208 | A1 | 1/2008 | Martin |
| 2008/0066662 | A1 | 3/2008 | Hesla |
| 2008/0257237 | A1 | 10/2008 | Friesen et al. |
| 2008/0303238 | A1 | 12/2008 | Fichter |
| 2009/0000796 | A1 | 1/2009 | Cooper et al. |
| 2009/0056962 | A1 | 3/2009 | Martin et al. |
| 2009/0084295 | A1 | 4/2009 | Schaffert |
| 2009/0235853 | A1 | 9/2009 | Schaffert |
| 2010/0059238 | A1 | 3/2010 | Kovach et al. |
| 2011/0155031 | A1 | 6/2011 | Arnett et al. |
| 2012/0048160 | A1 | 3/2012 | Adams et al. |
| 2012/0210919 | A1 | 8/2012 | Van et al. |
| 2012/0210920 | A1 | 8/2012 | Bassett |
| 2012/0241181 | A1 | 9/2012 | Horsch |
| 2012/0325133 | A1 | 12/2012 | Whalen et al. |
| 2013/0074747 | A1 | 3/2013 | Schaffert et al. |
| 2013/0112121 | A1 | 5/2013 | Achen et al. |
| 2013/0160684 | A1 | 6/2013 | Whalen et al. |
| 2013/0263767 | A1 | 10/2013 | Trevino et al. |
| 2014/0033958 | A1 | 2/2014 | Bassett |
| 2014/0116735 | A1 | 5/2014 | Bassett |
| 2015/0075825 | A1 | 3/2015 | Dufty |
| 2016/0014951 | A1 | 1/2016 | Stark et al. |
| 2016/0050837 | A1 | 2/2016 | Schaffert et al. |
| 2016/0106025 | A1 | 4/2016 | Nelson et al. |
| 2016/0120096 | A1 | 5/2016 | Patwardhan et al. |
| 2017/0000006 | A1 | 1/2017 | Raetzman et al. |
| 2017/0208736 | A1 | 7/2017 | Schaffert et al. |
| 2019/0029165 | A1 | 1/2019 | Leimkuehler et al. |
| 2019/0271356 | A1 | 9/2019 | Schaffert et al. |
| 2019/0364747 | A1 | 12/2019 | Freeman |
| 2020/0396894 | A1 | 12/2020 | Radtke et al. |
| 2021/0161063 | A1 | 6/2021 | Schaffert et al. |
| 2021/0168994 | A1 | 6/2021 | Schaffert et al. |
| 2021/0301863 | A1 | 9/2021 | Schaffert et al. |
| 2022/0078966 | A1 | 3/2022 | Schaffert et al. |
| 2022/0240439 | A1 | 8/2022 | Schaffert |
| 2023/0255142 | A1 | 8/2023 | Isaac et al. |
| 2024/0057498 | A1 | 2/2024 | Schaffert et al. |
| 2024/0147886 | A1 | 5/2024 | Schaffert |
| 2024/0260503 | A1 | 8/2024 | Schaffert et al. |

FOREIGN PATENT DOCUMENTS

| | | | |
|---|---|---|---|
| DE | 3321490 | A1 | 12/1984 |
| DE | 3441610 | A1 | 5/1986 |
| DE | 4235389 | A1 | 3/1994 |
| EP | 2055508 | A2 | 5/2009 |
| EP | 2055509 | A1 | 5/2009 |
| EP | 1964459 | B1 | 12/2011 |
| GB | 2572309 | A | 9/2019 |
| WO | 2018148776 | A1 | 8/2018 |

OTHER PUBLICATIONS

Author Unknown, “1200 Series Advanced Seed Meter Planters,” Case Iil, 2005, 1-35.
Author Unknown, “3000 Series Kinze Planters,” 2003, 3-6 and 12.
Author Unknown, “8000 Series Planters: Simply Advanced,” White Planters, 2001, 13-15.
Author Unknown, “Brochure: The Precision Vacuum Planter, NG Plus Series,” A.T.I., Inc., Monosem, Lenexa, Kansas, at least as early as Dec. 21, 2007, 10 pages.
Author Unknown, “Changing Planting Depth,” at least as early as Dec. 21, 2007, 3 pages.
Author Unknown, “Cost-Effective Solutions for Real-World Needs,” Yetter Profitable Solutions, at least as early as Dec. 21, 2007, 1-29.
Author Unknown, “Dawn 1572/1500 Coulter Combo,” Jul. 28, 2004, 2 pages.
Author Unknown, “Dawn Curvtine™ Closing Wheel,” 1997, 2 pages.
Author Unknown, “Dawn Trashwheels Row Cleaner,” at least as early as Dec. 21, 2007, 1 page.
Author Unknown, “Ferti-Placer,” Schaffert Manufacturing Co., Inc., at least as early as Dec. 21, 2007, 2 pages.
Author Unknown, “Groff AG Improvements, LLC,” at least as early as Dec. 21, 2007, 4 pages.
Author Unknown, “Hawkins Manufacturing Inc.,” at least as early as 2002, 1 page.
Author Unknown, “Heavy-Duty Coulter,” at least as early as Dec. 21, 2007, 3 pages.
Author Unknown, “http://precision_planting.com/html/keeton.html,” at least as early as Dec. 30, 2000, 1 page.
Author Unknown, “Keeton Seed Firmer,” J & K Enterprises, 1994, 2 pages.
Author Unknown, “Keeton Seed Firmer, Precision Planting,” at least as early as Apr. 9, 2001, 4 pages.
Author Unknown, Photos Labeled “Photo A” and “Photo B,” Oct. 17, 2007, 1 page.
Author Unknown, “Planter ‘N’ Forcer, Planter Fertilizer Attachments online product information description,” Hawkins Mfg. Inc. Retrieved from http://www.hawkinsmfg.com/ attachments.htm on Dec. 9, 2012, 2 pages.
Author Unknown, “Planter Fertilizer Attachments,” Hawkins Manufacturing Inc., at least as early as Dec. 21, 2007, 4 pages.
Author Unknown, “Seed to Soil Inforcer,” Seed Flap, Spring 1995, 1 page.
Author Unknown, “Sunco: Effectively Moves Trash in All Conditions!”, at least as early as Dec. 21, 2007, 2 pages.
Author Unknown, “Sunco: Your Solution for Accurate Starter Fertilizer Placement,” at least as early as Dec. 21, 2007, 2 pages.
Author Unknown, “Tine-Tooth Row Tillage Attachment,” at least as early as Dec. 21, 2007, 9 pages.
Author Unknown, “Tube Alignment Brackets,” M & J Cotton Farms, Inc., at least as early as Oct. 30, 1995, 1 page.
Author Unknown, “We Know It’s All About Strong Roots,” Yetter Profitable Solutions, at least as early as Dec. 21, 2007, pp. 1-29.
Author Unknown, “Yield-Pro Planters: Unsurpassed in form, function and safety,” Great Plains, at least as early as Dec. 21, 2007, pp. 4, 5 and 10.
Author Unknown, “Yield-Pro Planters: Yield increasing row spacing options coupled with best in class productivity and accuracy,” at least as early as Dec. 21, 2007, 1 page.
Finck, “Where to start with starter fertilizer,” Farm Journal, Jan. 1996, pp. 15-16.
Prosecution Document, U.S. Application filed Mar. 23, 2012, U.S. Appl. No. 13/428,922, filed Mar. 23, 2012, 136 pages.
Prosecution Document, Utility U.S. Appl. No. 13/646,507, filed Oct. 5, 2012, 126 pages.
Schaffert Manufacturing Co, Inc., Brochure entitled “Breaking New Ground with Cutting-Edge Planting Attachments”, Mar. 2022, 13 pages.
Tye Drill, “Photo of Soybean Special Drill”, (2007), at least before Jan. 1, 2008, 1 page.

TRAILING ARM ASSEMBLY WITH COMPACT LINKAGE ASSEMBLY

CROSS-REFERENCE TO RELATED APPLICATIONS

This application claims the benefit of priority pursuant to 35 U.S.C. § 119(e) of U.S. Provisional Patent Application No. 63/346,758, filed May 27, 2022, titled "Trailing Arm Assembly With Compact Linkage Assembly," which is hereby incorporated by reference herein in its entirety.

FIELD

The described examples related to agricultural seed planters and, in particular, to furrow closing systems.

BACKGROUND

Multi-row planters may be used for agricultural seed planting. A planter may include multiple row units configured for opening a seed furrow, depositing seeds within the furrow, and closing the seed furrow around the seeds. In some cases, each row unit of the planter may also open a fertilizer furrow adjacent to each seed furrow, deposit liquid fertilizer in each fertilizer furrow, and close each fertilizer furrow. Further, a press wheel or firmer wheel may often be used for compacting the soil in the seeded furrows after the soil has been planted and, in some instances, after a closing wheel has deposited loose soil overtop of the seed. In general, the portions or assemblies of the planter configured to open furrows can be referred to as opener assemblies and the portions or assemblies configured to close furrows can be referred to as closing assemblies, closer assemblies, or trailing assemblies.

Conventional closing assemblies for the planter may use standard swing arm tail sections, which can be found on many of the planters built today. But, these swing arm tail sections have limited flexibility for traveling up and down to accommodate uneven terrain as the planter travels through the field. At certain speeds, the swing arm closing systems are constantly moving or vibrating up and down along the planter unit itself, causing uneven depth control.

In some cases, planters may employ one or more conventional parallel linkages that pivotally couple the planter to the closing or trailing assembly. Conventional parallel linkages may include at least two sets of parallel linkages that extend between the planter (or opener assembly) and one or more components of the closing assembly. The two sets of parallel linkages may include linking plates. The linking plates of each set of parallel linkages are separated laterally by a fixed space. Conventional parallel linkages may thus be substantially wide, with the linking plates separated from one another, and disposed on either side of a center longitudinal plane of the linkage, such as a plane that generally bisects the row unit. The inclusion of linkages on either side of the center longitudinal plane may weigh down the linkage and generally impair the ability of the linkage to adapt to uneven and inconsistent field conditions. Further, the width of conventional linkages may, among other drawbacks, generally impair handling and turning of the trailing assemblies, and corresponding responsiveness of furrow closing components attached to the closing assembly. As such, there is a need for systems and techniques to improve the adaptability of linkages for planter trailing assemblies.

SUMMARY

Examples of the present invention are directed to trailing arm assemblies with compact linkage assemblies.

In one example, a linkage assembly for a trailing arm assembly is disclosed. The linkage assembly includes a first coupling bracket configured for mounting to a planter or first sub-assembly of the trailing arm assembly. The linkage assembly further includes a second coupling bracket configured for mounting with a second subassembly of the trailing arm assembly. The linkage assembly further includes a parallel linkage pivotally coupling the first coupling bracket and the second coupling bracket and disposed on a center longitudinal plane of the linkage. The center longitudinal plane bisects the first coupling bracket and the second coupling bracket. The linkage assembly further includes a biasing assembly coupled with the parallel linkage and manipulatable to selectively apply a down force to the second coupling bracket. In such an example, the parallel linkage can include a first linkage and a second linkage. In one example, the first and second linkages are separated by a fixed space at the second coupling bracket, the linkage further includes a stop feature coupled to the second coupling bracket and arranged within the fixed space, the stop feature being configured to define a travel of the first and second linkages along the center longitudinal plane, and the stop feature is adjustable relative to the second coupling bracket in order to selectively limit an amount of the travel of the first and second linkages along the center longitudinal plane.

In another example, the parallel linkage includes a first linkage and a second linkage. Each of the first and second linkage may pivotally couple the first and second coupling brackets to one another. The biasing assembly may further include a biasing element mount pivotally coupled to the first linkage. The biasing assembly may further include a biasing element having a first end coupled to the second linkage and a second end coupled to the biasing element mount.

In another example, the biasing element mount may include a U-shaped saddle configured to receive a side portion of the first linkage. The U-shaped saddle may include a first saddle end configured to pivotally couple with the first linkage, and a second saddle end, opposite the first saddle end, configured to engage the biasing element. Further, the U-shaped saddle may define a series of graduated through holes adjacent the second saddle end and that extend generally perpendicular to the center longitudinal plane. The biasing assembly may further include a retention feature selectively engageable with holes of the series of graduated holes in order to define an angular position of the U-shaped saddle relative to the first linkage. The biasing assembly mount may further include a hook connected to the U-shaped saddle at the second saddle end, the hook configured for engagement with second end of the biasing element.

In another example, the parallel linkage may include a first linkage and a second linkage. Each of the first and second linkage may pivotally couple the first and second coupling brackets to one another. The first and second linkages may be separated by a fixed space at the second coupling bracket. In one example, the second coupling bracket defines a track and the stop feature includes a stop body and a fastener received in the track and engaging the stop body. In one example, the stop feature includes a lower landing fixed relative to the second coupling bracket and an upper landing selectively adjustable relative to the lower landing.

In another example, the parallel linkage include a first linkage having an I-beam portion. The first linkage may further include a first pivot portion and a second pivot portion disposed at opposing ends of the I-beam portion. The first pivot portion may be configured to pivotally couple with the first coupling bracket. Further, the second pivot portion may be configured to pivotally couple with the second coupling bracket with the I-beam portion extending therebetween.

In another example, the first linkage may include a biasing element engagement tab extending from the I-beam portion and configured for engagement with an end of a biasing element. The first linkage may include a third pivot portion coupled with the I-beam portion and configured for rotational engagement with the biasing assembly. In some cases, the first linkage may include both the third pivot and the biasing element engagement tab.

In another example, a linkage assembly for a trailing arm assembly is disclosed. The linkage assembly includes a first coupling bracket configured for mounting to a planter or first sub-assembly of the trailing arm assembly. The linkage assembly further includes a second coupling bracket configured for mounting with a second subassembly of the trailing arm assembly. The linkage assembly further includes a parallel linkage pivotally coupling the first coupling bracket and the second coupling bracket and disposed on a center longitudinal plane of the linkage. The center longitudinal plane may bisect the first coupling bracket and the second coupling bracket. The linkage assembly further includes an actuator coupled with the parallel linkage and manipulatable to selectively apply a down force to the second coupling bracket. In one example, the linkage assembly includes a stop coupled to the second coupling bracket, the stop being adjustable within the center longitudinal plane relative to the second coupling bracket.

In another example, the actuator may further include a screw-driven linear actuator.

In another example, the parallel linkage may include a first linkage having a first actuator coupling region and a second linkage having a second actuator coupling region. The first linkage may pivotally couple the first and second coupling brackets one another and have the first actuator coupling region adjacent the second coupling bracket. Further, the second linkage may pivotally couple the first and second coupling brackets with one another and have the second actuator coupling region adjacent the first coupling bracket. In this regard, the actuator may include a first end coupled to the first linkage in the first actuator coupling region. the actuator may further include a second end coupled to the second linkage in the second actuator coupling region.

In another example, the linkage assembly may further include a torsion axle fixed to the first linkage at the first actuator coupling region. The first end of the actuator may be pivotally attached to the torsion axle. The torsion axle may be configured to allow travel between the first end of the actuator and the first linkage. The travel may be constrained by a plurality of torsion bumpers integrated with the torsion axle.

In another example, a linkage for a trailing arm assembly is disclosed. The linkage assembly may include a first coupling bracket configured for mounting to a planter or first sub-assembly of the trailing arm assembly. The linkage assembly may further include a second coupling bracket configured for mounting with a second subassembly of the trailing arm assembly. The linkage assembly may further include a parallel linkage including a first linkage and a second linkage. The first and second parallel linkages may pivotally couple the first coupling bracket and the second coupling bracket. The linkage assembly may further include a biasing element mount pivotally coupled to the first linkage. The linkage assembly may further include a biasing element having a first end coupled to the second linkage and a second end coupled to the biasing element mount. In one example, the linkage assembly includes a stop adjustably secured to the second coupling bracket, the stop configured to selectively limit an amount of the travel of the first and second linkages.

In another example, the first and second parallel linkages may each include an I-beam portion extending between the first and second coupling bracket. Further, one or both of the first and second linkages may include a biasing element engagement tab extending from the respective I-beam portion and configured for engagement with the first end and/or the second end of the biasing element. Further, one or both of the first and second linkages may include a pivot portion coupled with the respective I-beam portion and configured for rotational engagement with the biasing element mount. In one example, the first coupling bracket or the second coupling bracket is Y-shaped.

In addition to the exemplary aspects and examples described above, further aspects and examples will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
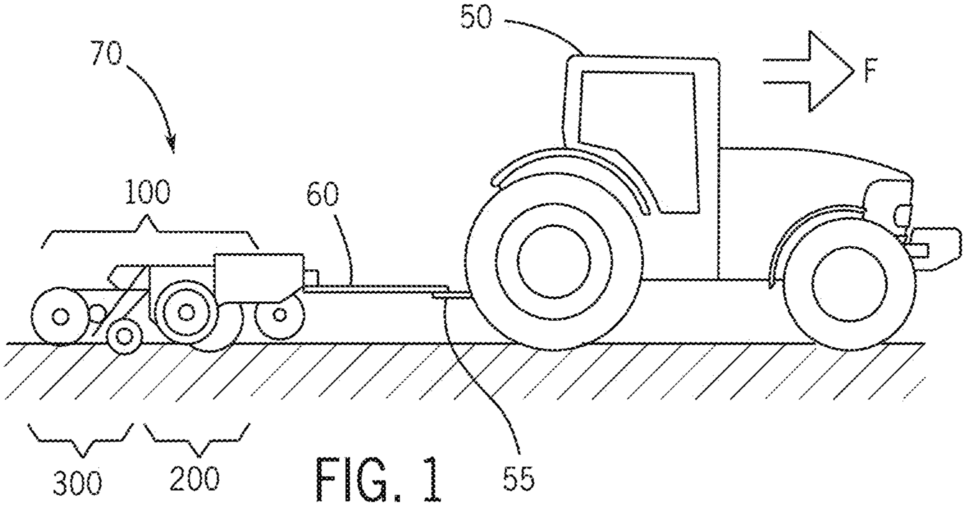
FIG. 1 depicts a side elevation view of an agriculture tractor pulling an agriculture planter.

The description that follows includes sample systems, methods, and apparatuses that embody various elements of the present disclosure. However, it should be understood that the described disclosure may be practiced in a variety of forms in addition to those described herein.

The following disclosure relates generally to linkage assemblies for trailing arm assemblies of a planter. An example trailing arm assembly may be coupleable to a planter and define row units for planting seeds, distributing liquid fertilizer, and pressing/closing soil, among other functions. The trailing arm assembly may be subject to vibration, up and down movement, elevation changes relative to a tractor, and/or other forces as the planter travels through the field. A parallel linkage may be used to couple the trailing arm assembly to a planter frame or other component in order to permit a degree of travel of the trailing arm assembly relative to the planter. Additionally or alternatively, a parallel linkage may also be used to couple various sections or subassemblies of the trailing arm assembly to one another. For example, a parallel linkage may be used to couple a furrow opener assembly to a furrow closer assembly, thereby permitting relative movement of the opener and closer assemblies. However, conventional parallel linkages often employ two sets of parallel linkages (including 4-bars in each linkage) that are separated by a fixed, lateral space in order to couple the respective assemblies with a total of four links. Each set of parallel linkages may be separated from a central longitudinal plane of the row unit. The conventional arrangement, as noted above, may include excess components that weigh down the linkage assembly and/or define a substantially wide linkage that limits responsiveness both to field conditions and to movements or turning of the planter.

The linkage assembly of the present disclosure may mitigate such hindrances by providing a substantially compact or narrow linkage assembly. The compact linkage assembly may operate to pivotally couple the planter (or other components) with a component or subassembly of the trailing arm assembly, thereby allowing for travel between the pivotally coupled components. The compact linkage assembly may be narrower, lighter-weight, and define a smaller footprint than conventional linkages. In this regard, the compact linkage assembly (or "linkage assembly" as used herein) may be more responsive to field conditions, including elevation changes and movements of the planter.

To facilitate the foregoing, the linkage assembly of the present disclosure may include a parallel linkage configured to support pivotal coupling between the planter (or other components) with a component or subassembly of the trailing arm assembly. The parallel linkage may be disposed along a center longitudinal plane of the linkage assembly. The center longitudinal plane may generally bisect the row unit. For example, the parallel linkage may include a first linkage and a second linkage that is generally parallel with, and below, the first linkage. The first and second linkages may be disposed on, such as being centered on, the center longitudinal plane. The first and second linkages may operate to pivotally couple the planter (or other components) with the component or subassembly of the trailing arm assembly without the need for additional linkages that would otherwise be disposed offset from the center plane. As such, coupling may be accomplished using fewer components, thereby forming a lighter-weight and smaller-footprint linkage than conventional techniques.

The first and second linkages of the disclosed linkage assembly may be constructed to exhibit enhanced strengthen and rigidity over conventional plate-type linkages. For example, one or both of the first or second linkages may be formed including an I-beam portion extending along a length of the linkage. The I-beam portion may include flange portions with a web extending therebetween. A first pivot portion and a second pivot portion may be disposed at opposing ends of the I-beam portion. The first pivot portion may be configured to pivotally couple with, for example, a first coupling bracket or other component associated with the planter or trailing arm assembly. Further, the second pivot portion may be configured to pivotally couple with, for example, the second coupling bracket or other component of the trailing assembly. In some cases, the first and/or second linkages may be arranged with each respective web on the center longitudinal plane of the row unit.

The linkage assemblies of the present disclosure may further be configured to selectively induce a downforce on the first and second linkages and/or associated components of trailing arm assembly to minimize instances of the components and assemblies from bouncing and separating from the furrow as the tractor travels over uneven ground. In one example, a biasing element, such as a spring, may be integrated with the first and second linkages. The biasing element may be selectively deformed such that the biasing element maintains a target predetermined downforce on the linkages of the trailing assembly. For example, the linkage assembly may include a biasing element mount pivotally coupled with the first (top) linkage. The biasing element may have a first end coupled to the second (bottom) linkage, such as at a tab or other engagement feature, and a second end coupled to the biasing element mount, such as at a hook or other feature. A rotational position of the biasing element mount may be set relative to the first linkage, for example, using a retention pin or other feature. The rotational pin may set a distance of the second end of the biasing element relative to the first end, thereby selectively deforming the biasing element. In other configurations, other arrangements and integrations of the biasing element are contemplated and described herein.

Additionally or alternatively, an actuator may be used in order to selectively induce a downforce on the first and second linkages and/or associated component of the trailing arm assembly. For example, a screw-driven linear actuator may be used in order to electromechanically induce the downforce, as needed. The actuator may be integrated with the first and second linkages and may be generally disposed on or adjacent the center longitudinal plane of the row unit. In this regard, the first and second linkages may be adapted for mounting with the actuator. In one example, each of the first and second linkages may be defined by a generally tuning fork- or wishbone-type shape. A fork portion of the linkages may respectively define a first actuator coupling region of the first linkage, and a second actuator coupling region of the second linkage. The linkages may be arranged with the first and second actuator coupling regions separated along a longitudinal direction of the row unit such that one of the actuator coupling regions is adjacent the planter, and the other of the actuator coupling regions is adjacent the trailing assembly. The actuator may include a first end coupled to the first linkage in the first actuator coupling region, and a second end coupled to the second linkage in the second actuator coupling region. The actuator may operate to selectively move the first and second ends relative to one another in order to induce the desired downforce. In some cases, a torsion axle may be used at the first end in order to allow travel between the first end of the actuator and the first linkage, which may enhance damping and improve resiliency of the linkage assembly, particularly over rough terrain.

Figure 2:
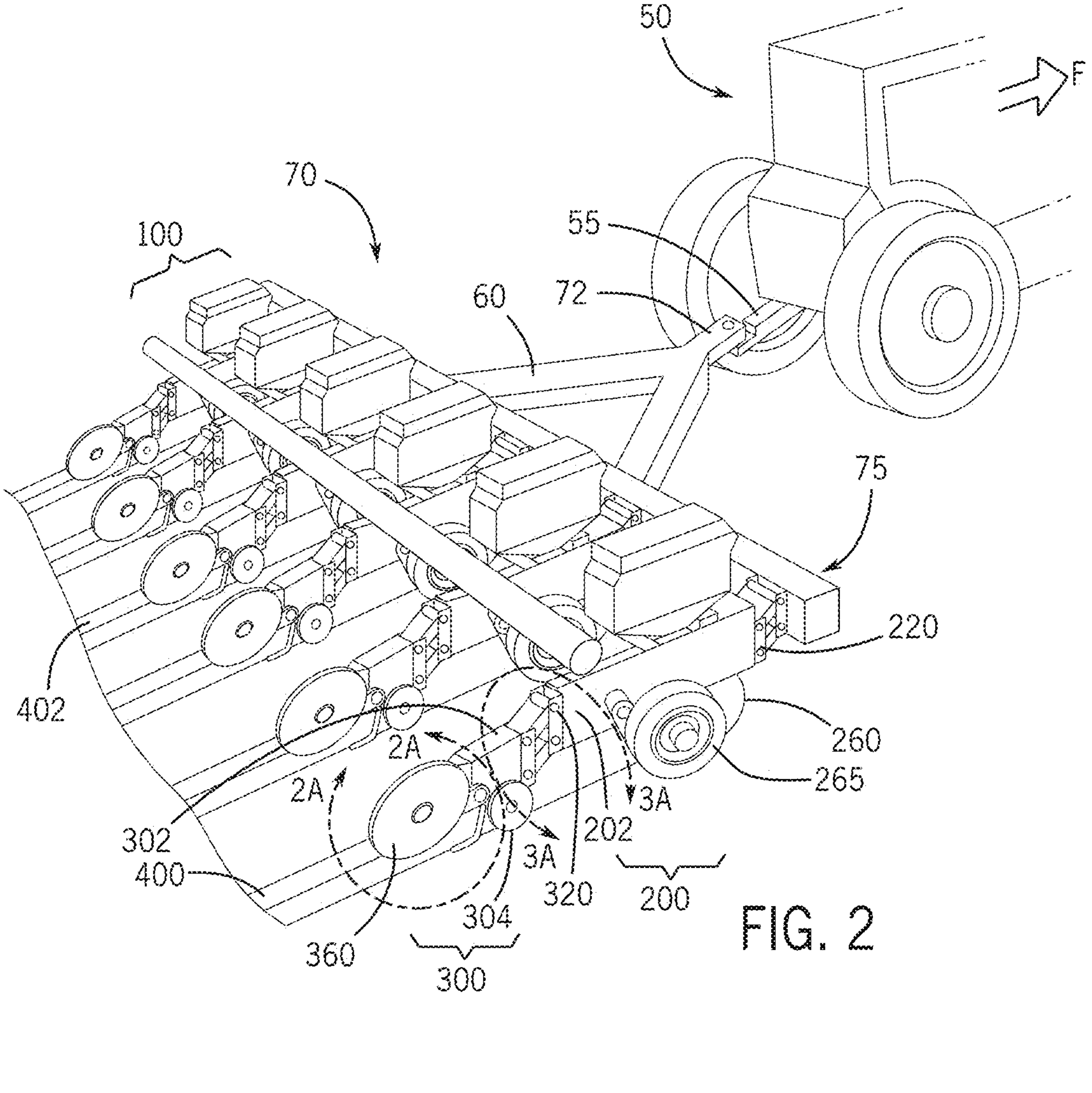
FIG. 2 depicts a top-rear isometric view of the planter.

Turning to the Drawings, an exemplary embodiment of an agriculture planter 70 having one or more trailing arm assemblies 100 attached to an agricultural tractor 50 is shown in FIGS. 1 and 2. The linkage assemblies of the present disclosure may be used with the agriculture planter 70 and/or trailing arm assemblies 100, as described herein below. For purposes of illustration, the agricultural tractor 50 may have a hitch receiver 55 extending rearward therefrom. As illustrated in FIG. 2, the planter 70 may include a planter frame 75 from which a yoke or frame 60 with a tongue or hitch 72 extends in a forward direction F. The hitch 72 connects with the hitch receiver 55 to couple the planter 70 to the tractor 50. Various planter components are supported on the planter frame 75 and extend therefrom in a rearward direction (opposite the forward direction F). The tractor 50 tows the planter 70 in the forward direction F indicated by the arrow and provides power to the planter 70 (e.g., via a power take off ("PTO"), not shown) for powering the operations of the planter 70. Additional operations of the planter 70 may be powered by hydraulics or electrical motors (not shown) powered by the tractor 50.

Components of the planter 70 may include a plurality of trailing arm assemblies 100. The trailing arm assemblies 100 may function as row units for planting seeds and distributing liquid fertilizer. Each trailing arm assembly 100 may be coupled with the planter frame 75 or yoke that extends from the front of the trailing arm assembly 100. Each trailing arm assembly 100 may be equipped with a furrow opener assembly 200. Each trailing arm assembly 100 may also be equipped with a trailing furrow closer assembly 300. As used herein, the term "row unit" can refer to a portion of the trailing arm assembly 100 configured to open and close a single furrow (e.g., furrow 402). For example, a row unit can include a single furrow opener assembly 200 coupled to and ahead of a single furrow closer assembly 300 to open and close, respectively, the same furrow 402.

In the exemplary embodiment shown, the furrow opener assembly 200 may including an opener assembly frame 202, which may be connected to the planter frame 75 via a parallel linkage 220, such as any of the linkage assemblies or parallel linkages described herein. The parallel linkage 220 allows the furrow opener assembly 200 and the furrow closer assembly 300 to move/translate up and down vertically (generally orthogonal to forward direction F) to follow the terrain (e.g., contours of the field), overcome obstacles (e.g., debris or the like), or otherwise negotiate similar changes in a surface 400 of a field. The furrow opener assembly 200 may include a guide wheel 265 and an opener disc 260, among other components. The furrow closer assembly 300 may include one or more closer wheels 360. In some embodiments, the furrow closer assembly 300 may further include a separate fertilizer opener wheel and a fertilizer dispenser. The vertical movement provided by the linkage may allow the trailing arm assemblies 100 to follow or translate up and down as the opener discs 260 and closer wheels 360 negotiate over or through an obstruction in a field surface 400 without adversely impacting seed deposit depth or resulting in damage to the components of the agricultural planter 50.

Because the trailing arm assemblies 100 are able to adjust to the contours of and variances in the field surface 400 through vertical translation via the parallel linkage 220, the opener discs 260 may be in generally consistent contact with the field surface 400, which may improve opening of furrows 402. Similarly, the trailing furrow closer wheels 360 may be in consistent contact with the field surface 400, which improves closing of the seed and fertilizer furrows 402.

The furrow opener assembly 200 may be coupled to the planter frame 75 via a connection that allows the trailing arm assembly 100 to move relative to the planter frame 75. In any of the examples contemplated herein, the connection may be configured to maintain an approximately constant relative orientation between the furrow opener assembly 200 and the frame 75 through the range of motion of the trailing arm assembly 100. For example, the furrow opener assembly 200 may connect to the frame 75 via the parallel linkage 220. In any of the examples disclosed herein, the parallel linkage 220 may include a pair of linkages that are generally arranged along a central longitudinal plane of the row unit.

The furrow closer assembly 300 may be coupled to the furrow opener assembly 200 via a connection that allows the furrow closer assembly 300 to move relative to the furrow opener assembly 300. In any of the examples described herein, the connection may be configured to maintain an approximately constant relative orientation between the furrow closer assembly 300 and the furrow opener assembly 200 through the range of motion of the furrow closer assembly 300. For example, the furrow closer assembly 300 may include a closer assembly frame 302, which may be connected to the furrow opener assembly 200 via a parallel linkage 320, such as any of the linkage assemblies described herein. In any of the examples contemplated herein, the parallel linkage 320 may include at least a pair of linkages that are generally arranged along a central longitudinal plane of the row unit. In some examples, the parallel linkage 320 may be positioned in front of the furrow opener assembly, for instance for use with a trash-cleaner attachment.

Figure 2A:
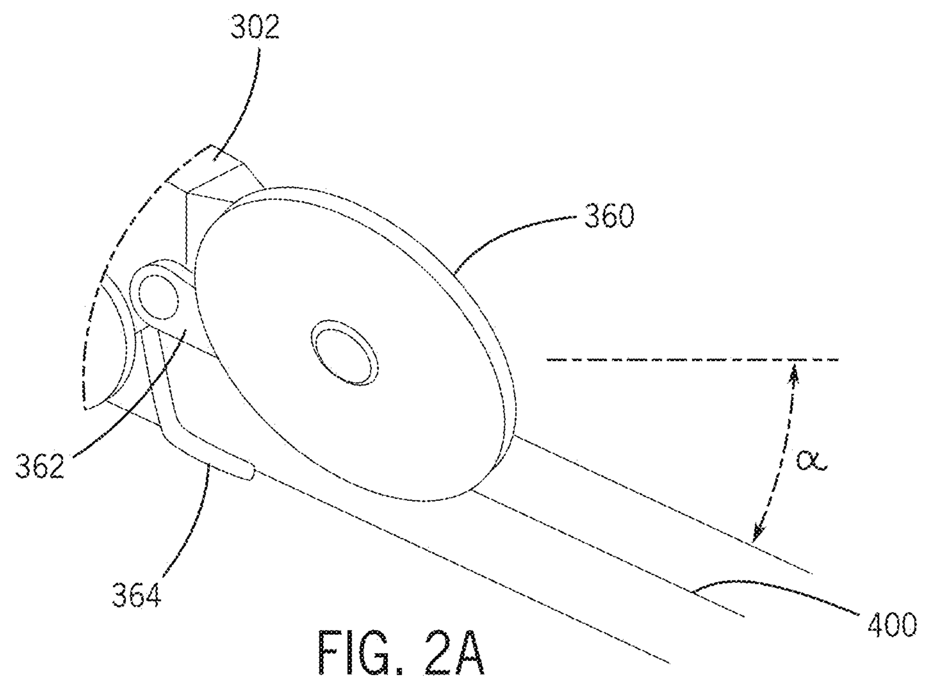
FIG. 2A depicts detail 2A-2A of a closing wheel of FIG. 2.
Figure 2B:
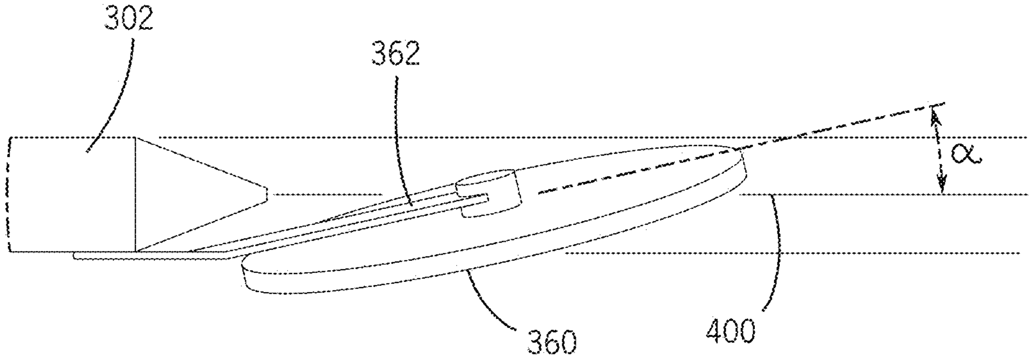
FIG. 2B depicts a top view of the closing wheel of FIG. 2A.

With reference to FIG. 2A, detail 2A-2A of FIG. 2 is shown. In FIG. 2A, the closer wheel 360 of an example row unit is shown engaged with a furrow 400. The closer wheel 360 may be coupled to the closer assembly frame 302 via a coupling link 362. An applicator tube 364 may be arranged forward of the closer wheel 360 in order to direct, for example, liquid fertilizer and/or seed to the furrow 400 prior to closing with the closer wheel 360. The tractor 50 may turn and maneuver across the field as needed. In response to movement of the tractor 50, the trailing arm assembly 100 may turn correspondingly. FIG. 2A shows an example angular displacement a of the closer wheel 360 as the tractor 50 turns. FIG. 2B shows the example angular displacement a of the closer wheel 360 from a top view. As explained herein, the linkage assemblies of the present disclosure may facilitate reducing a turning radius of the trailing arm assembly. For example, the linkage assemblies of the present disclosure may be shorter and/or more compact than conventional designs, which may allow for the trailing arm assembly 100 to have a shorter and/or more compact, and thus more responsive, turning radius.

Figure 3A:
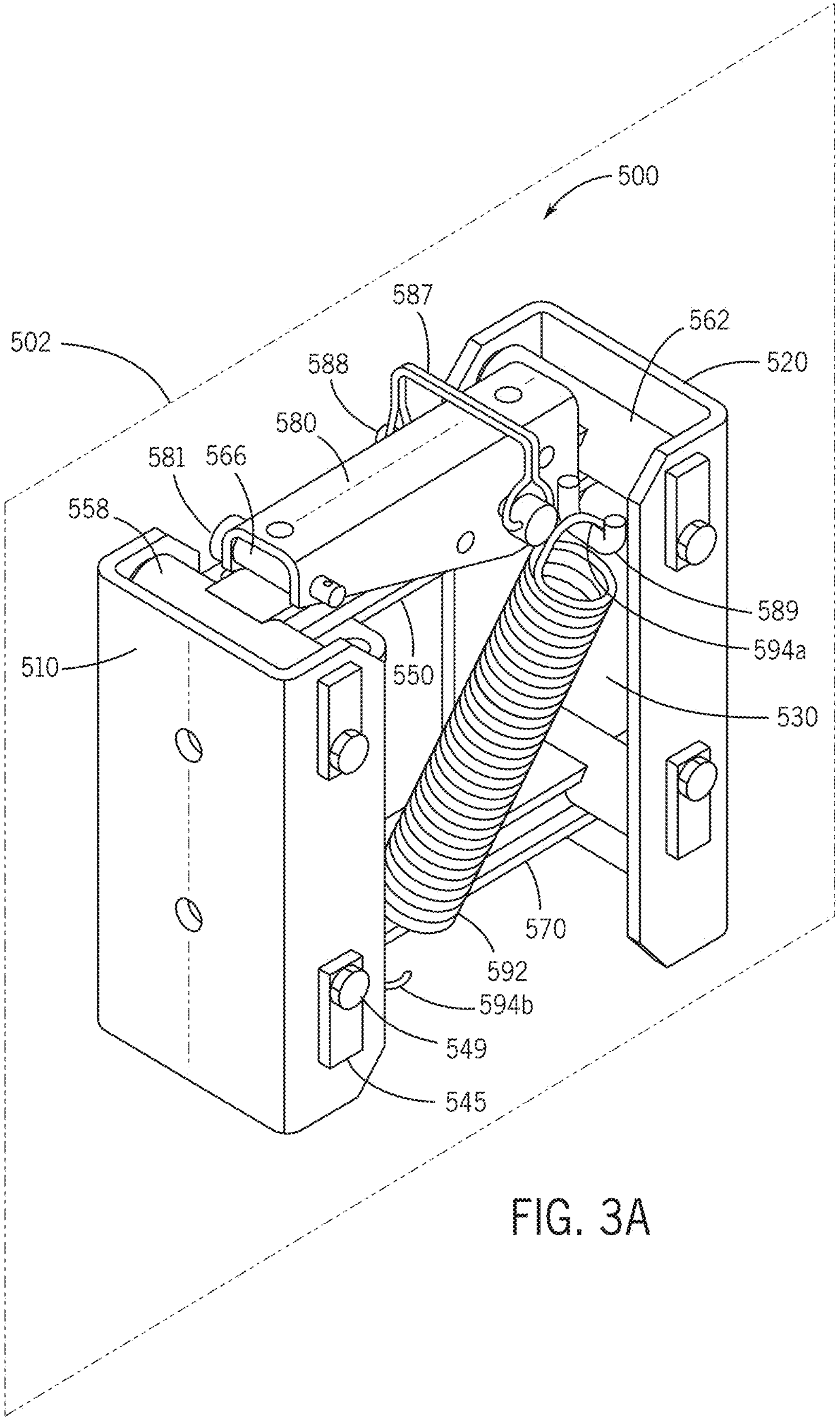
FIG. 3A depicts an example linkage assembly of the present disclosure.
Figure 3B:
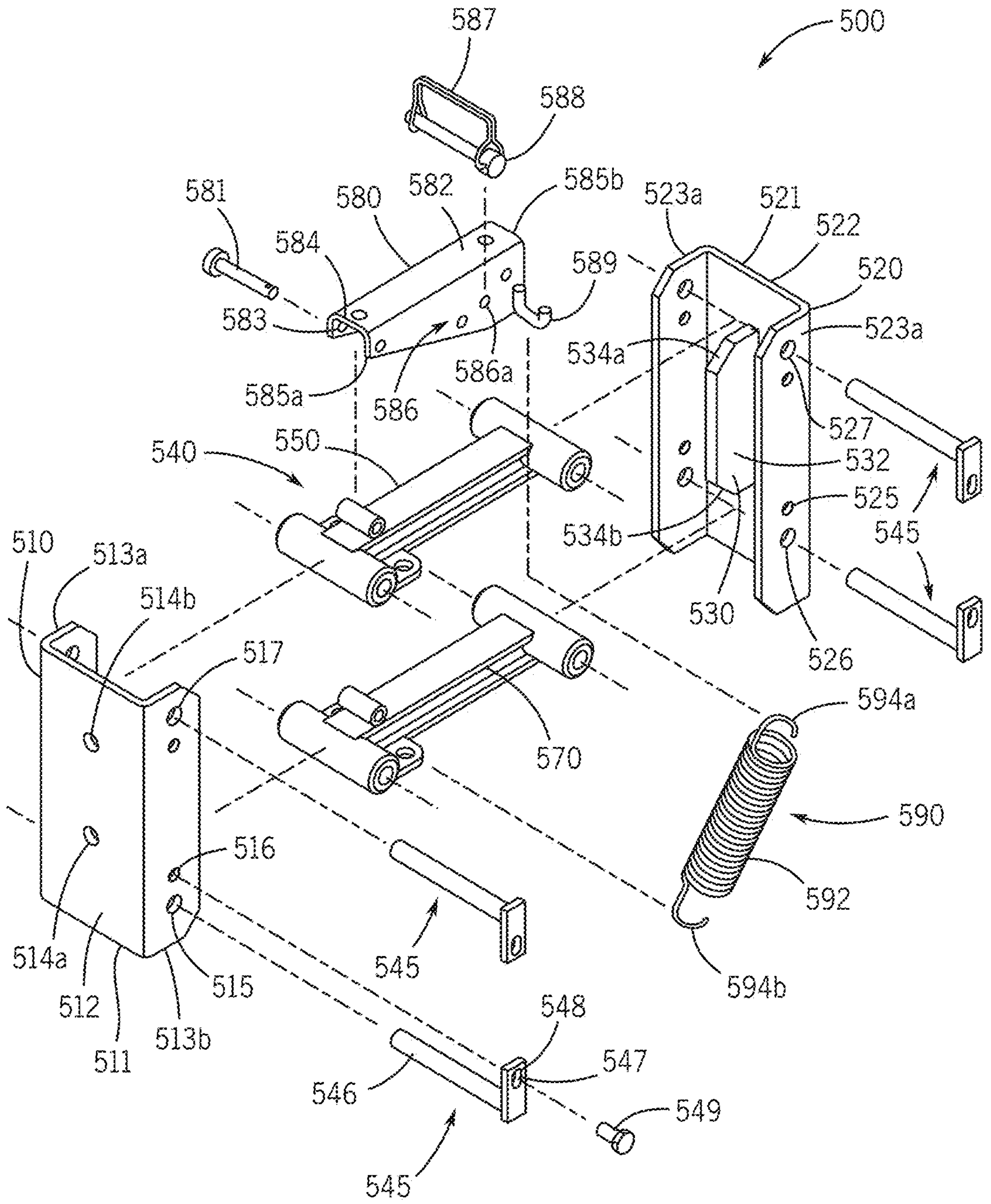
FIG. 3B depicts an exploded view of the example linkage assembly of FIG. 3A.

FIG. 3A depicts a sample linkage assembly 500 in an assembly configuration. FIG. 3B depicts an exploded view of the example linkage assembly 500. The linkage assembly 500 may broadly include a first coupling bracket 510 that is configured for mounting to the planter 70 and/or a first subassembly of the trailing arm assembly 100. The linkage assembly 500 may further include a second coupling bracket 520 that is configured for mounting with a second subassembly of the trailing arm assembly 100. In at least one example, the linkage assembly 500 can be the parallel linkage 220 shown in FIG. 2 such that the first coupling bracket 510 can be mounted to the opener assembly frame 202 and the second coupling bracket 520 can be mounted to the planter frame 75. In another example, the linkage assembly 500 can be the parallel linkage 320 shown in FIG. 2 such that the first coupling bracket 510 can be mounted to the closer assembly frame 302 and the second coupling bracket 520 can be mounted to the opener assembly frame 202.

The linkage assembly 500 may further include a parallel linkage 540 (shown in FIG. 3B) that is pivotally coupled with the first coupling bracket 510 and the second coupling bracket 520. The parallel linkage 540 may be disposed on, such as being centered on and/or at least partially arranged on, a center longitudinal plane 502 of the linkage assembly 500. The center longitudinal plane 502 may be a center longitudinal plane of a row unit of the planter 70, for example, such as a plane that substantially bisects the first coupling bracket 510 and the second coupling bracket 520. The linkage assembly 500 may further include a biasing assembly 580 coupled with the parallel linkage 540. The biasing assembly 580 may be manipulatable to selectively apply a downforce to the second coupling bracket 520. In this regard, the biasing assembly 580 may apply a downforce to components or subassemblies of the trailing assembly 100 that are attached to the second coupling bracket 520, such as a drills, wheels, closers, and so on.

With reference to FIG. 3B, the first coupling bracket 510 is shown. The first coupling bracket 510 may generally define a mount for coupling the linkage assembly 500 to the planter and/or components or subassemblies of the trailing arm assembly 100. The first coupling bracket 510 may further define a coupling feature for the parallel linkage 540, as described herein. As shown in FIG. 3B, the first coupling bracket 510 may include or be defined by a U-shaped body 511. The U-shaped body 511 may be formed from one or more pieces of a metal material, such as strengthened steel, as one example. The U-shaped body 511 may include a well side 512, a first wing side 513*a*, and a second wing side 513*b*. The first wing side 513*a* may be connected to the well side 512 and extend generally perpendicularly therefrom. The second wing side 513*b* may be connected to the well side 512, opposite the first wing side 513*a*, and extend generally perpendicularly therefrom. In this regard, the well side 512, the first wing side 513*a*, and the second wing side 513*b* may cooperate to form the U-shaped body 511. In some cases, the well side 512, the first wing side 513*a*, and the second wing side 513*b* may be portions of a single sheet of metal material, and the U-shaped body 511 may be formed through machining, bending, and/or otherwise processing the metal material into the desired shape. In other cases, the well side 512, the first wing side 513*a*, and the second wing side 513*b* may be separate sheets of metal material welded to one another.

The well side 512, the first wing side 513*a*, and the second wing side 513*b* may include various features to support the functionality of the first coupling bracket 510 for mounting to the planter 70 and/or subassembly of the trailing arm assembly 100, or for more generally defining a coupling portion for the parallel linkage 540. For example, as shown in FIG. 3B, the first coupling bracket 510 may include a first mounting feature 514*a* and a second mounting feature 514*b*. The first and second mounting features 514*a*, 514*b* may be holes that extend through a complete thickness of the well side 512. The first and second mounting features 514*a*, 514*b* may be configured to receive bolts and fasteners of various types and configurations. In this regard, the first coupling bracket 510 (and linkage assembly 500 more generally) may be secured to the planter 70 and/or a subassembly of the trailing arm assembly 100 using the first and second mounting feature 514*a*, 514*b*.

Further shown in FIG. 3B, the first coupling bracket 510 may include a lower connection feature 515, an upper connection feature, and a set holes 516. The lower and upper connection features 515, 517 may be defined by holes that extend through, respectively, each of the first and wing sides 513*a*, 513*b*. For example, the lower connection feature 515 may be defined by a first hole through the first wing side 513*a* and a second hole through the second wing side 513*b* that is axially aligned by the first hole through the first wing side 513*a*. The axially aligned holes (through the first and second wing sides 513*a*, 513*b*) of the lower connection feature 515 may be configured to receive an axle component and/or other feature to support the pivotal coupling or one or more linkages at the lower connection feature 515.

Further, the upper connection feature 517 may be defined by a first hole through the first wing side 513*a* and a second hole through the second wing side 513*b* that is axially aligned by the first hole through the first wing side 513*a*. The axially aligned holes (through the first and second wing sides 513*a*, 513*b*) of the upper connection feature 517 may be elevationally offset from the axially aligned holes of the lower connection feature 515. The axially aligned holes of the upper connection feature 517 may be configured to receive an axle component and/or other feature to support the pivotal coupling of one or more linkages at the upper connection feature 517. The first coupling bracket 510 may also include set holes 516 adjacent each of the holes of the respective connection features 515, 517. The set holes 516 may be configured to secure the axle component of the linkages, as described herein.

With further reference to FIG. 3B, the second coupling bracket 520 is shown. The second coupling bracket 520 may generally define a mount for coupling the linkage assembly 500 to components or subassemblies of the trailing arm assembly 100. The second coupling bracket 520 may further define a coupling feature for the parallel linkage 540, as described herein. As shown in FIG. 3B, the second coupling bracket 510 may be substantially analogous to the first coupling bracket 510 and include, among other components, a U-shaped body 521, a well side 522, a first wing side 513*a*, a second wing side 513*b*, a lower connection feature 525, an upper connection feature 527, and set holes 526.

Notwithstanding the foregoing similarities, the second coupling bracket 520 may include and/or be coupled with a stop feature 530. The stop feature 530 may include substantially any component that is arranged with the U-shaped body 521 and configured to limit travel of parallel linkage 540 that is coupled with the second coupling bracket 520. For example, the stop feature 530 may be positioned on the well side 522 and substantially between the first and second wing sides 513*a*, 513*b*. The stop feature 530 may be arranged to provide a physical impediment or block to linkages that are pivotally coupled to the lower and upper connection features 525, 527, as described herein.

In the example of FIG. 3B, the stop feature 530 is shown as including a stop body 532, an upper landing 534*a*, and a lower landing 543*b*. The stop body 532 can be a metal component welded to the well side 522 and extending generally perpendicular therefrom. The stop body 532 may define the upper landing 543*a* as an angular surface adjacent the upper connection feature 527. The upper landing 543*a* may be arranged so that a linkage may be free to pivot at the upper connection feature 527 along a predetermined degree or travel limited by a physical contact between the upper landing 543*a* and the linkage. Further, the stop body 532 may define the lower landing 543*b* as an angular surface adjacent the lower connection feature 525. The lower landing 543*b* may be arranged so that a linkage may be free to pivot at the lower connection feature 525 along a predetermined degree or travel limited by a physical contact between the lower landing 543*b* and the linkage.

Many, or possibly all, of the features, components, and/or parts, including the arrangements and configurations thereof shown in FIGS. 3A and 3B may be included, either alone or in any combination, in any of the other examples of devices, features, components, and parts shown in the other figures described herein. Likewise, any of the features, components, and/or parts, including the arrangements and configurations thereof shown and described with reference to the other figures may be included, either alone or in any combination, in the example of the devices, features, components, and parts shown in FIGS. 3A and 3B.

Figure 3C:
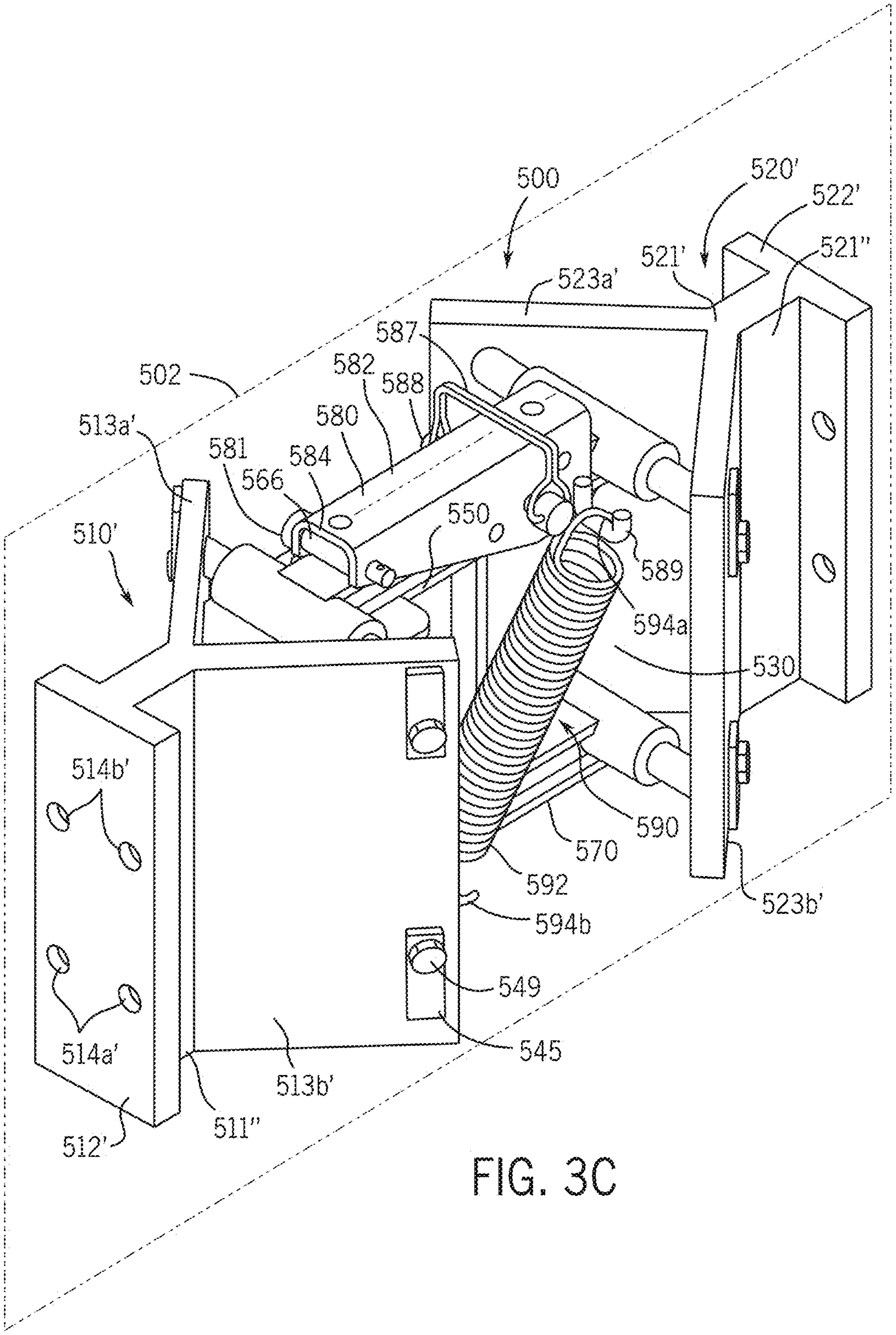
FIG. 3C depicts an example linkage assembly of the present disclosure.

FIG. 3C depicts an example linkage assembly 500 in an assembled configuration including a first coupling bracket 510' in the form of a Y-shaped I-beam and a second coupling bracket 520' in the shape of a Y-shaped I-beam. Similar to the coupling bracket 510 shown in FIGS. 3A and 3B, the first coupling bracket 510' of FIG. 3C is configured for mounting to the planter 70 and/or a first subassembly of the trailing arm assembly 100. The second coupling bracket 520', which is also formed as a Y-shaped I-beam, is configured for mounting with a second subassembly of the trailing arm assembly 100, similar to the second coupling bracket 520 of FIGS. 3A and 3B. The first bracket 510' may include a Y-shaped I-beam having a connection side 512' and a web 511' extending from the connection side 512' along with or parallel to the center longitudinal plane 502. In addition, the first bracket 510' may include first and second wing sides 513*a*' and 513*b*', respectively, extending from the web 511' non-parallel to the center longitudinal plane 502. The first wing side 513*a*' may extend from the web 511' opposite the second wing side 513*b*', as shown.

In such an example, the connection side 512' may define a number of through holes, including a plurality of mounting holes or mounting features 514*b*' and 514*a*'. The connection side 512', the first wing side 513*a*', and the second wing side 513*b*' may include various features to support the functionality of the first coupling bracket 510' for mounting to the planter 70. For example the frame 75 shown in FIG. 2, and/or subassembly of the trailing arm assembly 100, or for more generally defining a coupling portion for the parallel linkage 540. For example, as shown in FIG. 3C, the first coupling bracket 510' may include a first and second mounting features 514*a*' and 514*b*', respectively. The first and second mounting features 514*a*', 514*b*' may be holes that extend through a complete thickness of the connection side 512'. The first and second mounting features 514*a*', 514*b*' may be configured to receive bolts and fasteners of various types and configurations. In this regard, the first coupling bracket 510' (and linkage assembly 500 more generally) may be secured to the planter 70 and/or a subassembly of the trailing arm assembly 100 using the first and second mounting feature 514*a*', 514*b*'.

The second mounting bracket 520' shown in FIG. 3C may include the same or similar components as that of the first mounting bracket 510', including a connection side 522', a web 521" extending from the connection side 522' and parallel to or along the center longitudinal plane 502, a first wing side 523*a*' extending from the web 521" non-parallel to the center longitudinal plane 502, and a second wing side 523*b*' extending from the web 521" opposite the first wing side 523*a*' and non-parallel to the center longitudinal plane 502. The connection side 522' may define similar mounting features configured to assist in the mounting of the second mounting bracket 520' to the planter frame 75 (shown in FIG. 2).

The linkage assembly 500 shown in FIG. 3C may include similar, like-referenced components as that shown in the example of FIGS. 3A and 3B. In at least one example, the linkage assembly 500 may be the parallel linkage 220 shown in FIG. 2 such that the first coupling bracket 510' may be mounted to the opener assembly frame 202 and the second coupling bracket 520' may be mounted to the planter frame 75. In another example, the linkage assembly 500 may be the parallel linkage 320 shown in FIG. 2 such that the first coupling bracket 510 may be mounted to the closer assembly frame 302 and the second coupling bracket 520 may be mounted to the opener assembly frame 202.

As noted above, other components of the linkage assembly 500 shown in FIG. 3C, which includes first and second Y-shaped I-beam coupling brackets 510' and 520', respectively, may be similar to those components of the linkage assembly 500 shown in FIGS. 3A and 3B. These similar components may include a parallel linkage 540 that is pivotally coupled with the first coupling bracket 510' and the second coupling bracket 520' and a biasing assembly 580 coupled with the parallel linkage 540. The biasing assembly 580 a biasing element 590 may be manipulatable to selectively apply a downforce to the second coupling bracket 520'. In this regard, the biasing element 590 may apply a downforce to components or subassemblies of the trailing assembly 100 that are attached to the second coupling bracket 520', such as a drills, wheels, closers, and so on.

Many, and possibly all, of the features, components, and/or parts, including the arrangements and configurations thereof shown in FIG. 3C may be included, either alone or in any combination, in any of the other examples of devices, features, components, and parts shown in the other figures described herein. For example, linkage assemblies shown in other figures, for example FIGS. 3A and 3B, may include a first coupling bracket 510 formed as a U-shaped bracket and a second coupling bracket 520 may include a Y-shaped I-beam coupling bracket 520' shown in FIG. 3C. Conversely, at least one example of a coupling bracket may include a first coupling bracket 510' formed as a Y-shaped I-beam according to the example shown in FIG. 3B and a second coupling bracket formed as a U-shaped coupling bracket 510 as shown in FIGS. 3A and 3B.

Likewise, any of the features, components, and/or parts, including the arrangements and configurations thereof shown and described with reference to the other figures may be included, either alone or in any combination, in the example of the devices, features, components, and parts shown in FIG. 3C.

Figure 3D:
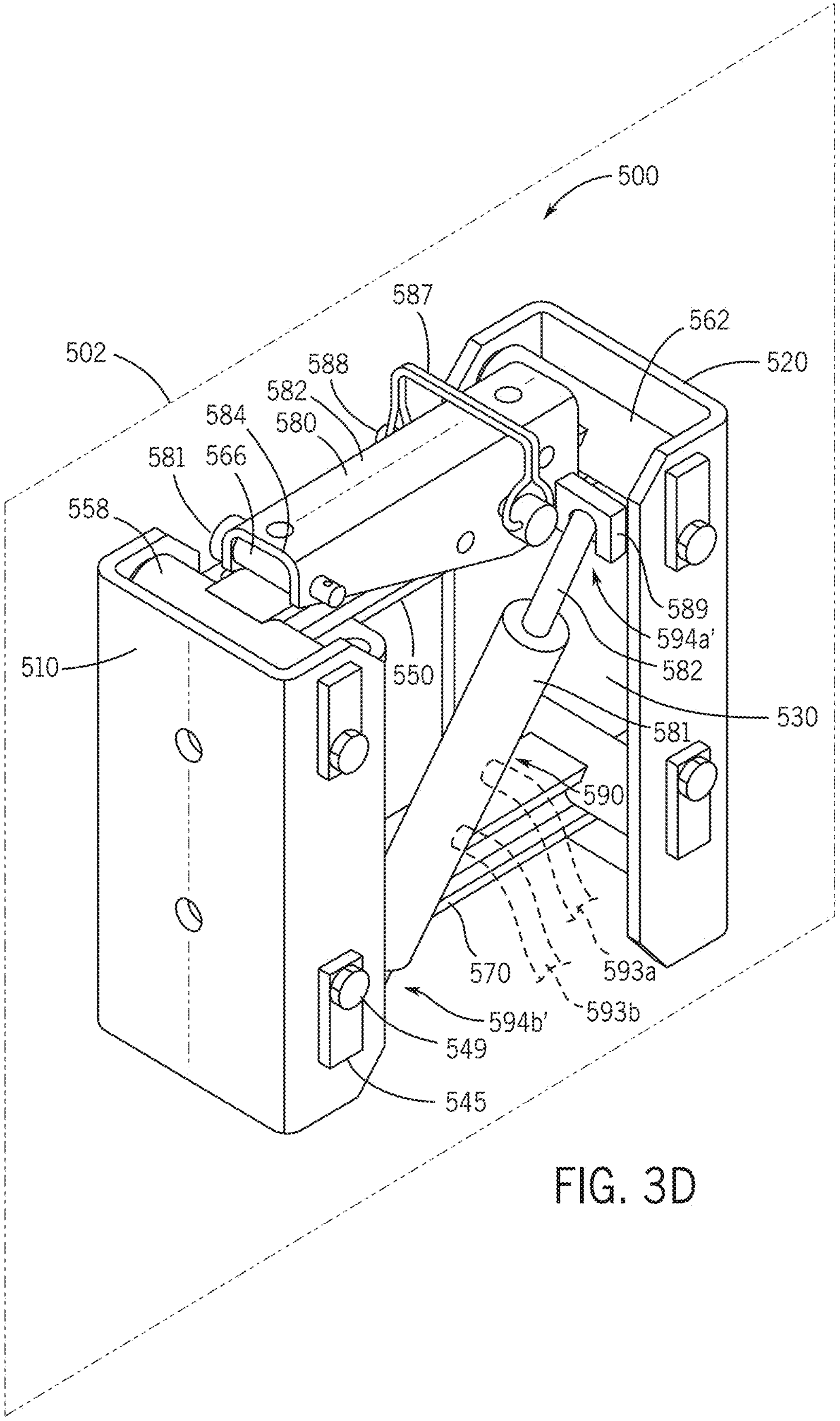
FIG. 3D depicts an example linkage assembly of the present disclosure.

FIG. 3D depicts an example linkage assembly 500 of the present disclosure similar to the linkage assembly 500 shown in FIGS. 3A and 3B but where the biasing element 590 includes a biasing cylinder assembly 590. In at least one example, the biasing cylinder assembly 590 may include a first cylinder 581 and a second cylinder 582 extending from, and longitudinally translatable relative to, the first cylinder 581. In such an example, the biasing assembly 580 may include a flange 589 extending from the U-shaped saddle 584 of the biasing element mount 582. The biasing cylinder assembly 590 may include a first end 594*a*' secured to the flange 589 and a second end 594*b*' secured to the first mounting bracket 510 and/or the second linkage 570 near the first mounting bracket 510. The force required to translate the second cylinder 582 to extend further out from the first cylinder 581 (i.e., the restoring force of the biasing cylinder assembly 590) may be adjusted.

In one example, the biasing cylinder assembly 590 may be an air cylinder assembly. In one example, the biasing cylinder assembly 590 may be a hydraulic cylinder assembly. In examples including a hydraulic cylinder assembly 590, a first tube 593*a* and a second tube 593*b* may be coupled with the first cylinder 581 to transfer fluid into and out of an internal volume defined by the first cylinder 581 to actuate the hydraulic cylinder assembly 590 and/or adjust a return force thereof. The first tube 593*a* may be coupled with a first fluid reservoir and a pump (not shown) and the outlet tube 593*b* may be coupled with a second fluid reservoir and a pump (not shown) configured to control the fluid fed into the internal volume of the first cylinder 581 and thus actuate the second cylinder 582 relative to the first cylinder 581.

Accordingly, the biasing assembly 580 and the biasing cylinder assembly 590 may be manipulatable or controllable to selectively apply a downforce to the second coupling bracket 520'. In this regard, the biasing cylinder assembly 590 may apply a downforce to components or subassemblies of the trailing assembly 100 that are attached to the second coupling bracket 520', such as a drills, wheels, closers, and so on.

Many, and possibly all, of the features, components, and/or parts, including the arrangements and configurations thereof shown in FIG. 3D may be included, either alone or in any combination, in any of the other examples of devices, features, components, and parts shown in the other figures described herein. Likewise, any of the features, components, and/or parts, including the arrangements and configurations thereof shown and described with reference to the other figures may be included, either alone or in any combination, in the example of the devices, features, components, and parts shown in FIG. 3D.

Figure 3E:
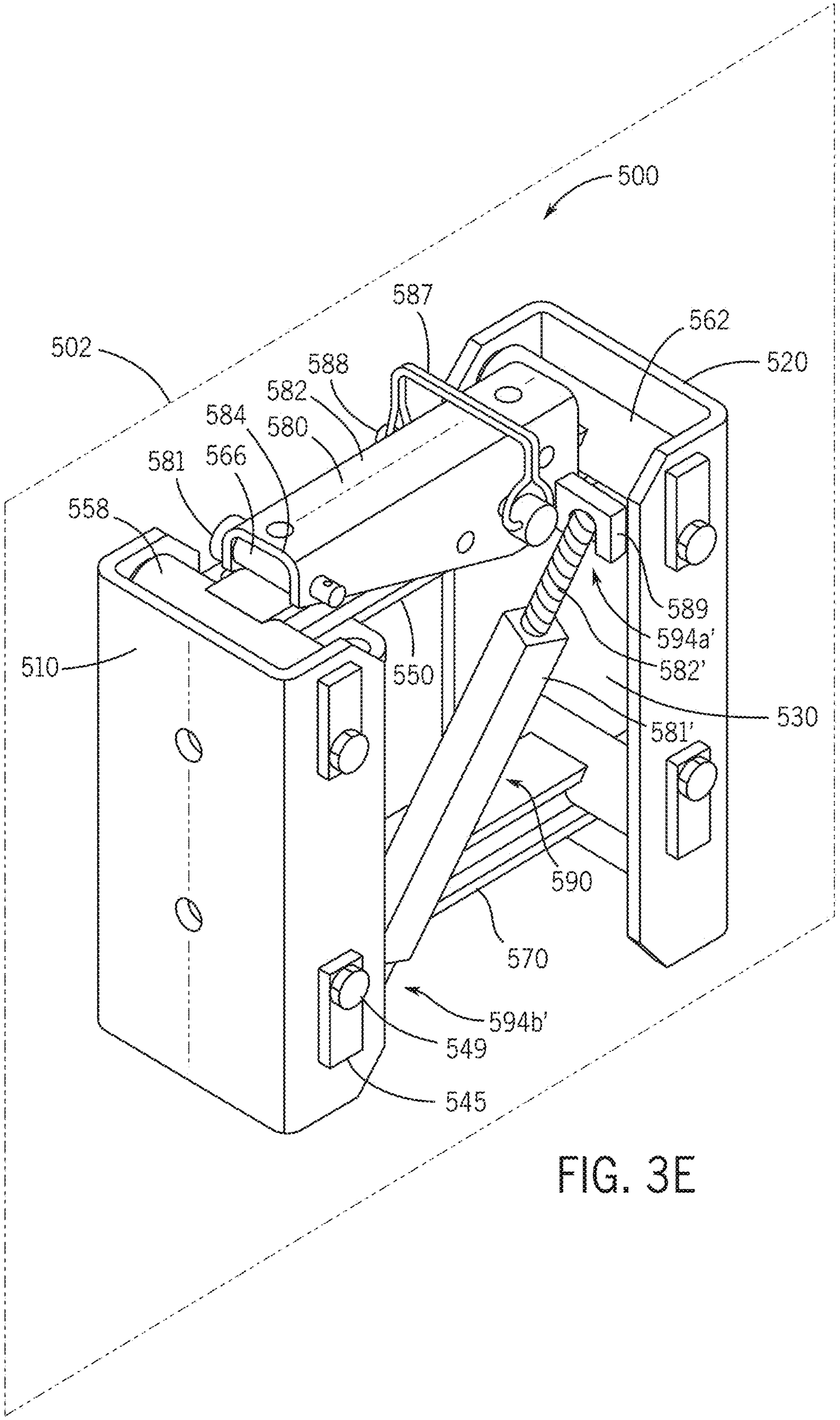
FIG. 3E depicts an example linkage assembly of the present disclosure.

FIG. 3E depicts an example linkage assembly 500 of the present disclosure similar to the linkage assembly 500 shown in FIGS. 3A and 3B but where the biasing element 590 includes a linear screw actuator 590. In at least one example, the linear screw actuator 590 may include a housing 581' and a lead screw 582' coupled with the flange 589. The housing 581' may include a motor bracket and the linear screw actuator may further include a slide block coupled with the housing via a guide rail. The motor bracket, motor, slide block, guide rail, or other components of the linear screw actuator may be disposed within the housing 581'. The lead screw 582' may be rotated via a motor to extend longitudinally relative to the housing 581' between the first and second ends 594*a*' and 594*b*' of the linear screw actuator 590.

In such an example, the biasing assembly 580 may include a flange 589 extending from the U-shaped saddle 584 of the biasing element mount 582. The linear screw actuator 590 may include a first end 594*a*' where the linear screw 582' couples to the flange 589 and a second end 594*b*' secured to the first mounting bracket 510 and/or the second linkage 570 near the first mounting bracket 510. The force required to articulate the lead screw 582' to extend further out from the first cylinder 581 (i.e., the restoring force of the linear screw actuator 590) may be adjusted.

Accordingly, the biasing assembly 580 and the linear screw actuator 590 may be manipulatable or controllable to selectively apply a downforce to the second coupling bracket 520. In this regard, the linear screw actuator 590 may apply a downforce to components or subassemblies of the trailing assembly 100 that are attached to the second coupling bracket 520, such as a drills, wheels, closers, and so on.

Many, and possibly all, of the features, components, and/or parts, including the arrangements and configurations thereof shown in FIG. 3E may be included, either alone or in any combination, in any of the other examples of devices, features, components, and parts shown in the other figures described herein. Likewise, any of the features, components, and/or parts, including the arrangements and configurations thereof shown and described with reference to the other figures may be included, either alone or in any combination, in the example of the devices, features, components, and parts shown in FIG. 3E.

Figure 4A:
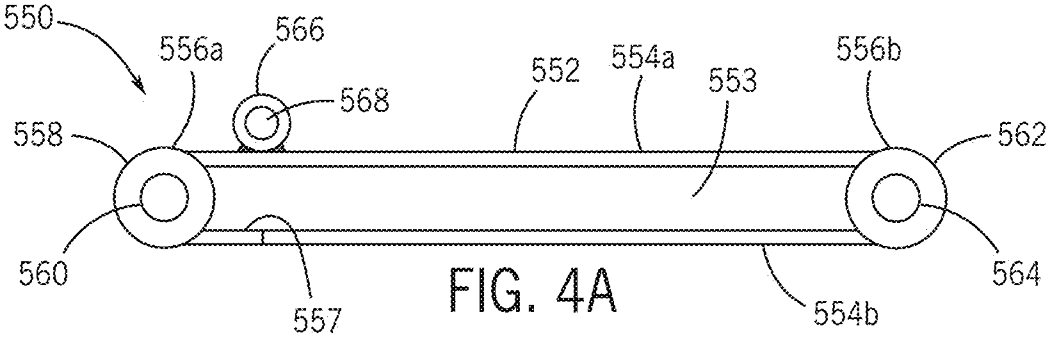
FIG. 4A depicts a side view of a linkage of the example linkage assembly of FIG. 3B.
Figure 4B:
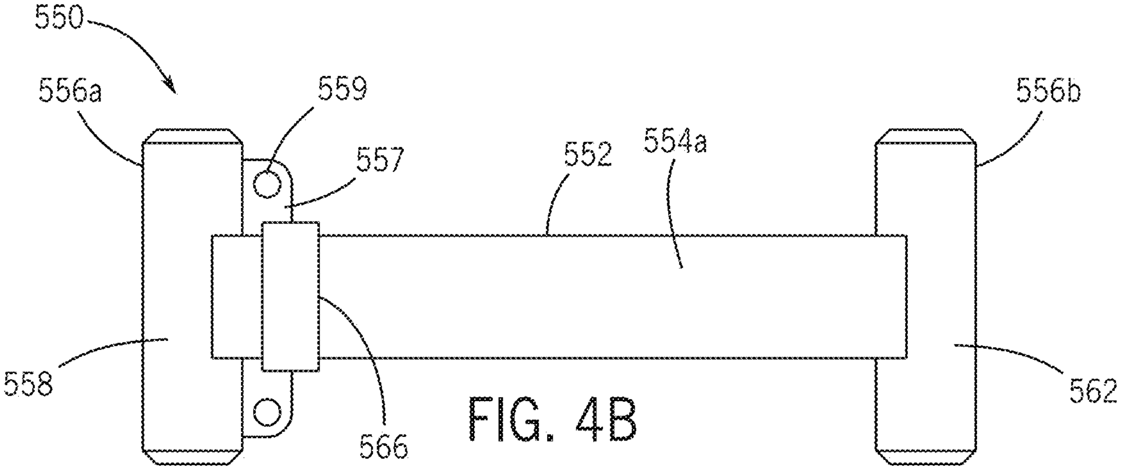
FIG. 4B depicts a top view of the example linkage of FIG. 4A.

With reference to FIG. 3B, the parallel linkage 540 is shown as including a first linkage 550 and a second linkage 570. The first and second linkages 550, 570, as shown in FIG. 3B, may have the same or similar constructions. FIGS. 4A and 4B show a side view and a top view of the first linkage 550, respectively. It will be appreciated that the following discussion of the first linkage 550 may equally be descriptive of the second linkage 570, and that the second linkage 570 may include the same or similar components as the first linkage 550.

The first linkage 550 is shown as including an I-beam portion 552, a first pivot portion 558, and a second pivot portion 562. The first pivot portion 558 may be configured to pivotally couple with the first mounting bracket 510. The second pivot portion 562 may be configured to pivotally couple with the second mounting bracket 520. The I-beam portion 552 may be arranged to extend between and be attached with the first and second pivot portions 558, 562. The I-beam portion 552 may include flange portions **554*a*, 554*b* and a web 553. The flange portions 554*a*, 554*b* may be generally parallel to one another, and the web 553 may extend generally perpendicularly between the flange portions 554*a*, 554*b*. The first pivot portion 558 may be a generally cylindrical component that defines an axle passage 560. The second pivot portion 562 may be a generally cylindrical component that defines an axle passage 564. The first pivot portion 558 may be coupled to the I-beam portion 552 at a first end 556*a*. The second pivot portion 562 may be coupled to the I-beam portion 552 at a second end 556*b***.

The first linkage 550 may further include various component to facilitate engagement of the first linkage 550 with the biasing assembly 580. For example, and as shown in FIGS. 4A and 4B, the first linkage 550 further includes a third pivot portion 566. The third pivot portion 566 may be a generally cylindrical component that defines a biasing mount passage 568. The third pivot portion 566 may be connected to the first flange portion **554*a*, such as being disposed along a topmost surface of the first flange portion 554*a* opposite the web 553. Further, the first linkage 550 may include a biasing element engagement tab 557. The biasing element engagement tab 557 may define one or more engagement feature 559 or holes therethrough. The engagement features 559 may be configured for coupling with a biasing element, such as receiving a hook or other feature from the end of a spring. The biasing element engagement tab 557 be connected to the first pivot portion 558 and the second flange portion 554*b*. For example, the biasing element engagement tab 557 may be generally elevationally aligned with the second flange portion 554*b* and extend to the first pivot portion 558. As shown in FIG. 4B, the biasing element engagement tab 557 may have a width that is less than the width of the first pivot portion 558**.

Figure 5:
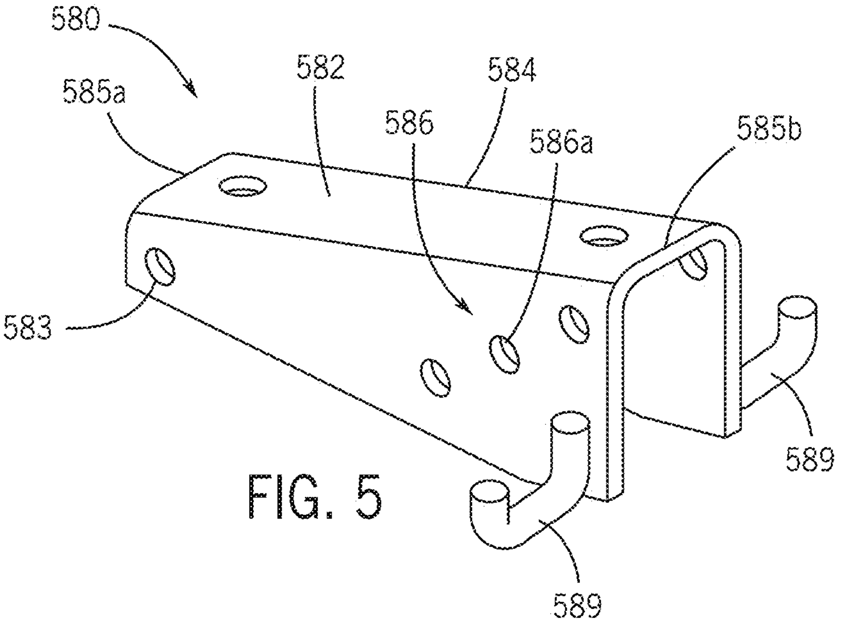
FIG. 5 depicts an isometric view of a biasing assembly of the example linkage assembly of FIG. 3B.

With reference to FIGS. 3B and 5, the biasing assembly 580 is shown. The biasing assembly 580 may generally include a biasing element mount 582, a retention feature 587, and a biasing element 590. With reference to the biasing element mount 582, this feature is shown as including a U-shaped saddle 584 and a hook 589. The U-shaped saddle 584 may be a piece of bent or formed metal material having three or more sides. The U-shaped saddle 584 may be shaped so as to sit on or otherwise receive a side or a flange portion of a respective I-beam of the linkages, for example flange portion **554*a* of first linkage 550 shown in FIG. 4A. Along the longitudinal direction, the U-shaped saddle may have a first end 585*a* and a second end 585*b* opposite the first end 585*a*. At the first end 585*a*, the U-shaped saddle 584 may include a pivot feature 583. The pivot feature 583 may include one or more holes extending through the U-shaped saddle configured to establish a pivotal coupling with, for example, the third pivot portion 566 such as via a coupling 581. At the second end 585*b*, the U-shaped saddle 584 may include a series of graduated holes 586, such as graduated hole 586*a*. The series of graduated holes 586 may extend generally perpendicularly to the center longitudinal plane 502 shown in FIG. 3A. Each hole of the series of graduate holes 586 may be graduated or otherwise at a different elevation as compared to an adjacent hole. As described herein, the retention feature 587 may selectively engage with a given hole of the series of graduated holes 586 in order to define the a rotational position of the biasing element mount 582 relative to the first linkage 550. Further at the second end 585*b*, the U-shaped saddle 584 may be coupled with one or more hooks 589. The one or more hooks 589** may be configured for engagement with an end of a biasing element, such as a corresponding hook or loop arranged at the end of the a spring.

With continued reference to FIG. 3B, the biasing element 590 and the retention feature 587 are shown. The biasing element 590 may include a coiled spring having a coiled section 592, a first end **594*a*, and a second end 594*b*. The coiled section 592 may permit the elastic deformation of the biasing element 590 and separation of the first and second ends 594*a*, 594*b*. The first and second ends 594*a*, 594*b* are shown as being defined as hooks formed from the end of the spring material or coil section 592. In this regard, the biasing element 590 may be integrated with the linkage assembly 550 using the first and second ends 594*a*, 594*b*; in other cases, other structures and engagement feature of the biasing element 590 are contemplated herein. The retention feature 587 is shown as having a retention pin 588. The retention pin 588 may have sufficient length to extend through one of the graduated hole 586 of the U-shaped saddle 584. The retention pin 588 may be sufficiently robust such that the retention pin 588 may define a stop for the mount 582 with one or more biasing elements, such as the biasing element 590, inducing a downforce on the mount 582**, as described herein.

As further shown in FIG. 3B, the linkage assembly 500 may include a plurality of axle components, such as an axle component 545. The axle components 545 may be used to facilitate the pivotal coupling of the linkages 550, 570 with the first and second coupling brackets 510, 520. It will be appreciated that while the axle component 545 is described herein below, the description of the axle component 545 may be representative and descriptive of each of the axle components described herein. In one example, the axle component 545 may include a rotational pin 546. The rotational pin 546 may be configured to extend through a complete thickness of a respective coupling bracket and pivot portion of a given linkage. For example, the rotational pin 546 may have a length that allows the rotational pin 546 to extend through the axially aligned connection holes of the lower connection features 515 and the axial passage 560 of a respective linkage. The axle component 545 may further include a stop plate 547. The stop plate 547 may be connected to an end of the rotational pin 546 and define a bolt hole 548. The bolt hole 548 may be alignable with a respective one of the set holes 516 when the rotational pin 546 is received in a given connection feature. A fastener 549 is further shown in FIG. 3B, which may be receivable through the bolt hole 548 and/or the set hole 516.

Any of the features, components, and/or parts, including the arrangements and configurations thereof shown in FIGS. 1-5 may be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 1-5.

Figure 6A:
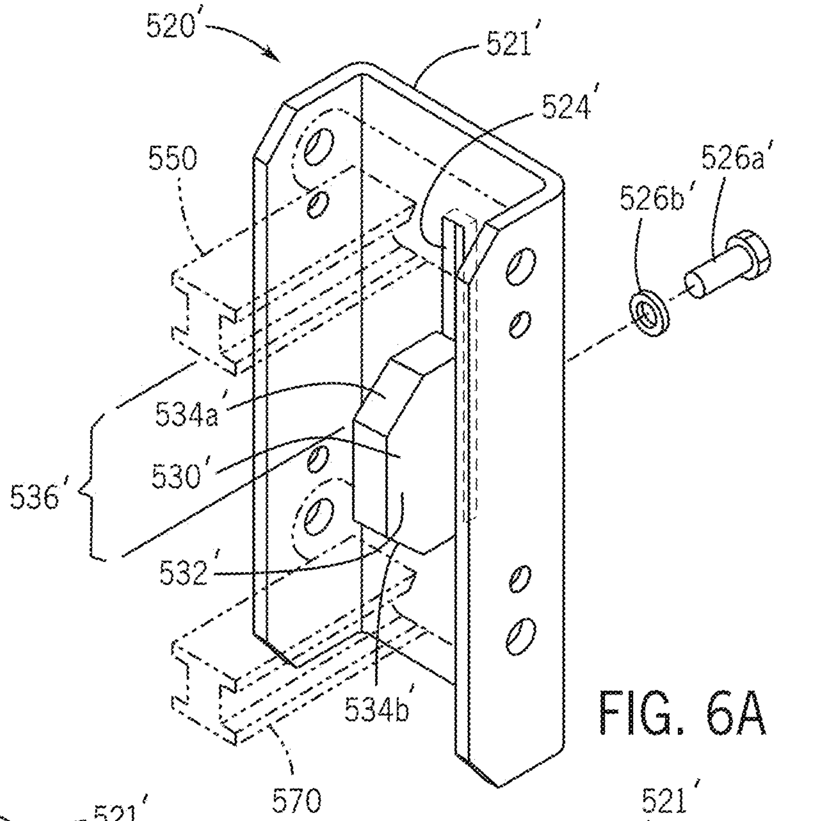
FIG. 6A depicts an example second coupling bracket of the example linkage assembly of FIG. 3B with an example stop feature in a first configuration.

In the example of FIG. 3B, the stop feature 530 is shown fixed to the U-shaped body 521. In other examples, a stop feature may be adjustable in various manners. For example, and with reference to FIGS. 6A-6N, variations are shown in which a stop feature may be adjustable in order to selectively define the travel of linkages coupled with the second coupling bracket 520. With reference to FIG. 6A, a second coupling bracket 520' is shown for the linkage assembly 500 of FIG. 5. The second coupling bracket 520' is substantially analogous to the second coupling bracket 520 of FIG. 5 and includes, among other components, a U-shaped body 511', a stop feature 530', a stop body 532', an upper landing 534*a*', and a lower landing 534*b'*.

Notwithstanding the foregoing similarities, the stop feature 530' may be selectively adjustable relative to the U-shaped body 521'. The stop feature 530' may be selectively adjustable in order to define a position of the upper and lower landings 534*a*', 534*b*' in the second coupling bracket 520'. Selectively defining the position of the upper and lower landings 534*a*', 534*b*' may set distance of the respective landings relative to the linkages (e.g., linkages 550, 570) and thus allow the linkages to pivot (travel) more or less, based on the selectively defined position of the stop feature 530'. To facilitate the foregoing, the U-shaped body 521' may define a track f. The track 524' may be a slotted through portion that extends along an elongated direction of the second coupling bracket 520. A fastener 526*a*' and a washer 526*b*' may optionally be provided, as shown in FIG. 6A. In one example, the stop feature 530' may be at least partially received in the track 524'. The stop feature 530' may be received in the track 524' and advanceable therealong, such as via a guide or other component associated with the stop feature 530'. The fastener 526*a*' may be used to engage the stop feature 530' and secure the stop feature 530' at a desired position along the track 524'. In other example, other mechanisms may be used to facilitate movement and selective securement of the stop feature 530'.

The stop feature 530' may be selectively positionable along the track 524' in order to define a limit to the travel of the linkages 550, 570. For example, and as shown in FIG. 6A, the linkages 550, 570 are shown (in dashed line) coupled to the second coupling bracket 520'. In FIG. 6A, the stop feature 530' may be arranged and seated at a lower portion of the track 524'. In the position of FIG. 6A, the stop feature 530' may be positioned at an offset 536' relative to, for example, a bottom surface of the linkage 550. The offset 536' may represent a distance that the linkage 550 can generally move or rotate through prior to contacting the stop feature 530', such as contacting the landing 534*a*'. For example, as shown in FIGS. 6B and 6C, the linkage 550 may rotate through the offset 536' and contact the stop feature 530' at or along the landing 534*a'*.

A value of the offset 536' may be based on the selectively defined position of the stop feature 530' along the track 524'. For example, and as shown in FIG. 6D, a fastener 526*a*' and washer 526*b*' may be provided that operate to secure the stop feature 530' at a selectively defined position along the track 524'. In some cases, the fastener 526*a*' may extend through the track 524' and be received (optionally, threadably) in the stop feature 530'. The fastener 526*a*' may be tightened such that a head or the fastener 524*a*' engages a rear faces of the U-shaped body 521', thereby compressing or clamping the U-shaped body 521' between the stop feature 530' and the head of the fastener 526*a'*.

Figure 6B:
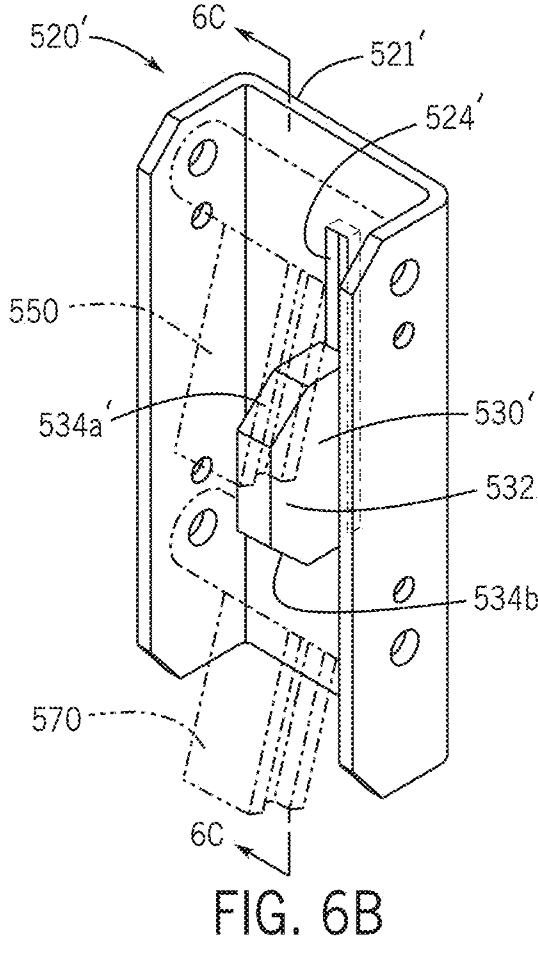
FIG. 6B depicts the example second coupling bracket of FIG. 6A with the example stop feature limiting travel of a parallel linkage of the example linkage assembly of FIG. 3B.
Figure 6C:
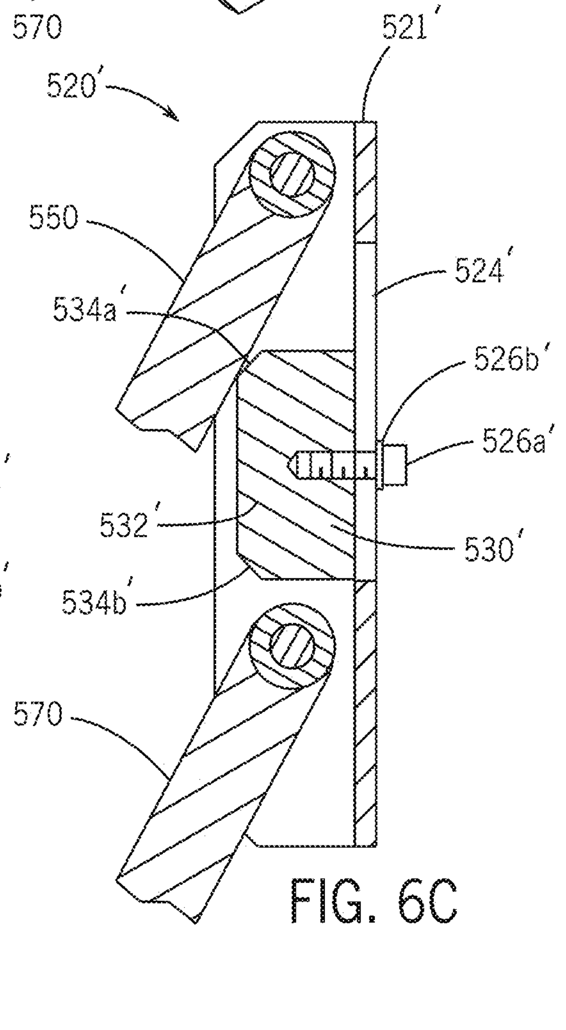
FIG. 6C depicts a cross-sectional view of the example second coupling bracket of FIG. 6B, taken along line 6C-6C of FIG. 6B.
Figure 6D:
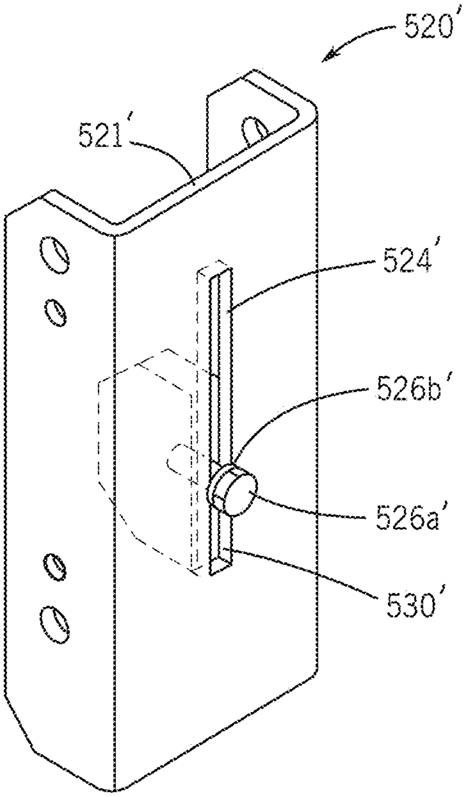
FIG. 6D depicts a rear isometric view of the second coupling bracket of FIG. 6A.

In FIG. 6D, the stop feature 530' is shown secured along the track 524' at the first position of the stop feature 530', as shown in FIGS. 6A and 6B. The fastener 526*a*' may be manipulated in order to permit movement of the stop feature 530' along the track 524' to a second, selectively defined position, for example, such as a position that modifies a value of the offset 536', and thereby limits the travel of the linkages 550, 570 to another distance. The fastener 526*a*' may subsequently be manipulated in order to secure and maintain the stop feature 530' at the second, selectively defined position.

Figure 6E:
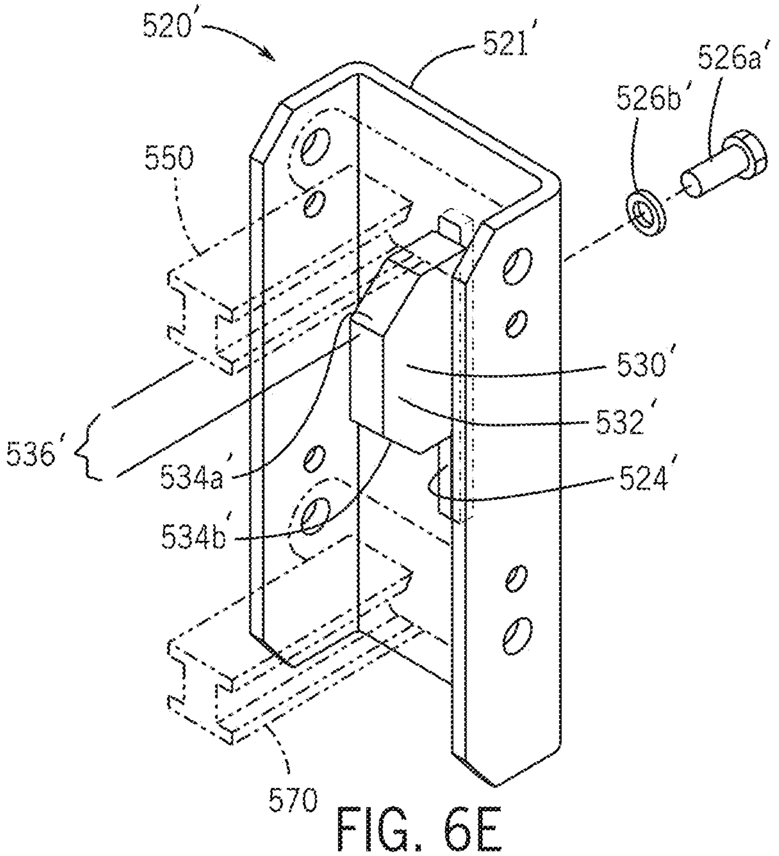
FIG. 6E depicts the second coupling bracket of FIG. 6A with the example stop feature in a second configuration.
Figure 6F:
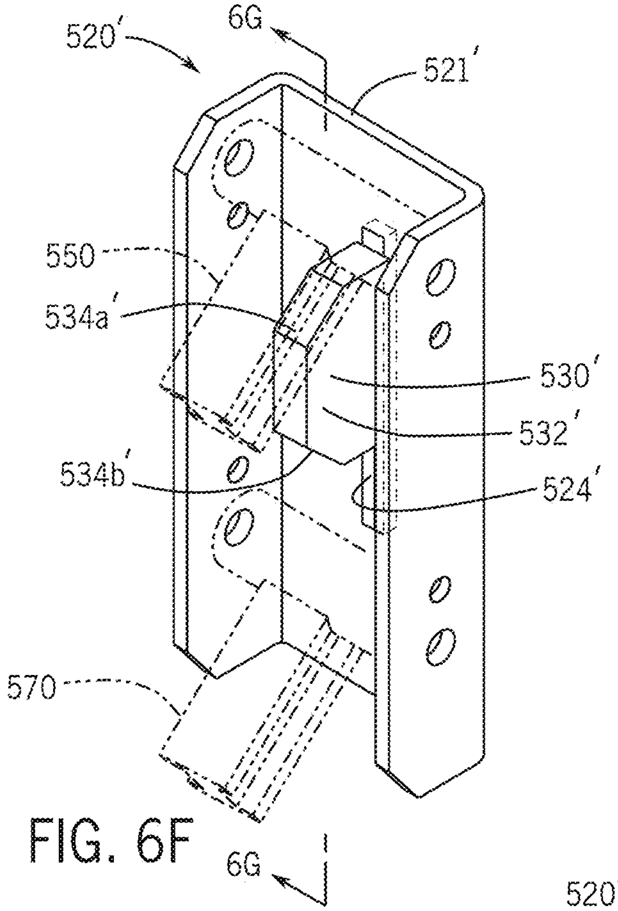
FIG. 6F depicts the example second coupling bracket of FIG. 6E with the example stop feature limiting travel of the parallel linkage.
Figure 6G:
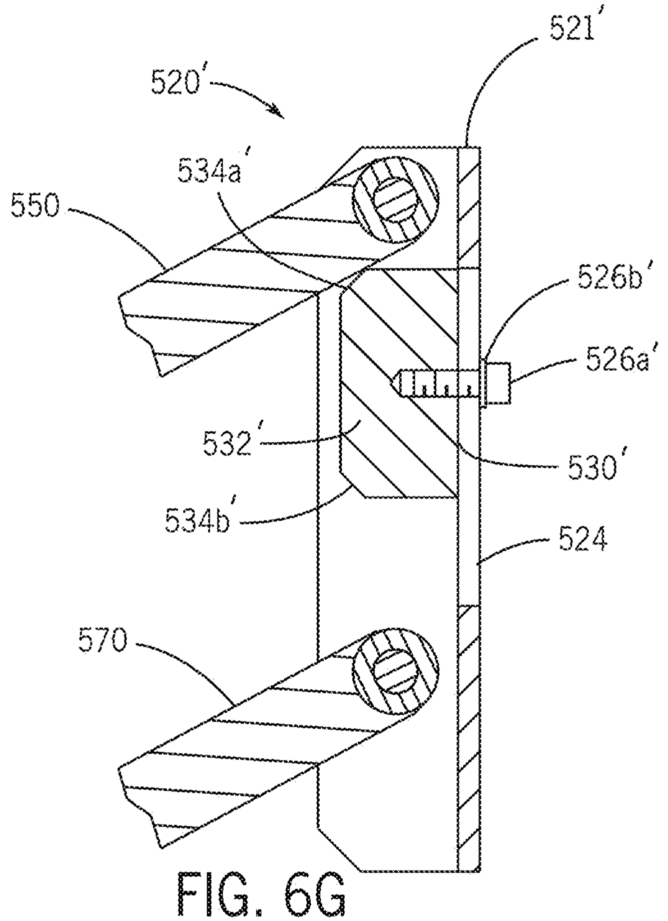
FIG. 6G depicts a cross-sectional view of the example second coupling bracket of FIG. 6G, taken along line 6G-6G of FIG. 6F

For example, and as shown in FIG. 6E, the stop feature 530' may be moved up toward an upper portion of the track 524' and secured at the second, selectively defined position. As shown in FIG. 6E, the stop feature 530' may be generally closer to the linkage 550 as compared to when the stop feature 530' is in the configuration of FIG. 6A. In this regard, the value of the offset 536' in the configuration of FIG. 6B may be less than the value of offset 536' in the configuration of FIG. 6A. In the configuration of FIG. 6E, the linkage 550 may therefore be permitted to travel a lesser amount (e.g., corresponding to the lesser value of the offset 536') as compared with configuration of FIG. 6A. For example, as shown in FIGS. 6F and 6G, the linkage 550 may rotate through the offset 536' and contact the stop feature 530' at or along the landing 534*a*', which may be a lesser amount of rotation compared to the rotation permitted with reference to the configuration of FIG. 6A. In this manner, the travel of the linkages 550, 570 may be adjusted by selectively positioning the stop feature 530' along the track 524'.

Any of the features, components, and/or parts, including the arrangements and configurations thereof shown in FIGS. 6A-6G can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6G.

Figure 6H:
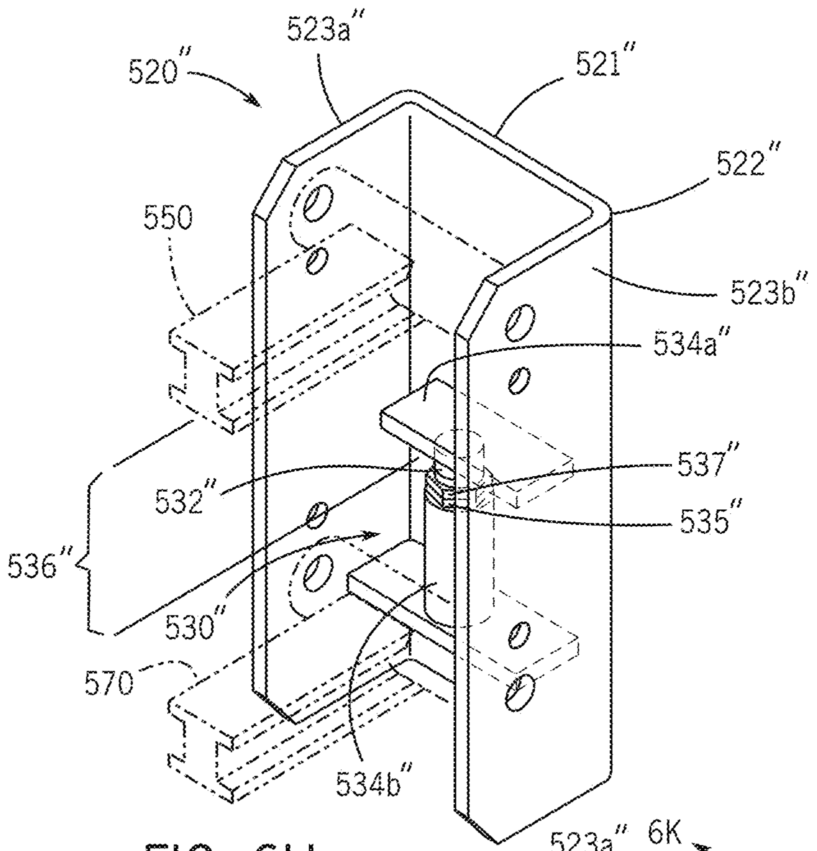
FIG. 6H depicts another example second coupling bracket of the example linkage assembly of FIG. 3B with another example stop feature in a first configuration.

With reference to FIG. 6H, a second coupling bracket 520" is shown for the linkage assembly 500 of FIG. 3B. The second coupling bracket 520" may be substantially analogous to the second coupling bracket 520 of FIG. 3B and includes, among other components, a U-shaped body 521", a well side 522", a first wing side 523*a*", a second wing side 523*b*", and a stop feature 530". Notwithstanding the foregoing similarities, the stop feature 530" may be selectively adjustable in order to set a rotational displacement or travel of linkages that are coupled with the second coupling bracket 520" (e.g., linkages 550, 570).

In the example of FIG. 6H, the stop feature 530" may include a threaded shaft 532" that is configured to adjust an upper landing 534*a*" relative to a lower landing 534*b*". In one example, the lower landing 534*b*" may be fixed relative to the U-shaped body 521" The lower landing 534*b*" may further define a portion of a housing or sleeve for the threaded shaft 532". In turn, the upper landing 534*a*" may generally be capable of movement relative to the lower landing 534*b*". For example, the upper landing 534*a*" may be coupled directly with the threaded shaft 532" The threaded shaft 532" may include a first nut 535" and a second nut 537". The first nut 535" and the second nut 537" may be selectively manipulated in order to adjust a separation of the upper landing 534*a*" and the lower landing 535*b*". For example, the first nut 535" may be rotated about the threaded shaft 532" in a manner that causes the upper landing 534*a*" to travel to an extended position. The second nut 537" may subsequently be rotated to a position adjacent the first nut 535" in order to secure the upper landing 534*a*" at the desired position. To retract the upper landing 534*a*", the operation may be reversed. For example, the second nut 537" may be rotated on the threaded shaft 532" to a position away from the lower landing 534", and the first nut 535" may be rotated in a similar manner in order to cause the threaded shaft 532" to retract.

In this regard, the upper landing 534" may move closer to and/or further away from a sample linkage pivotally coupled with the second coupling bracket 520", which may permit less or more travel of the linkage, as appropriate for a given application. Further, in order to accommodate the threaded shaft 532", the U-shaped body 522" may be generally deeper, with the first and second side wings 523*a*", 523*b*" having a greater width, as compared to analogous wings shown in FIG. 3B.

Figure 6I:
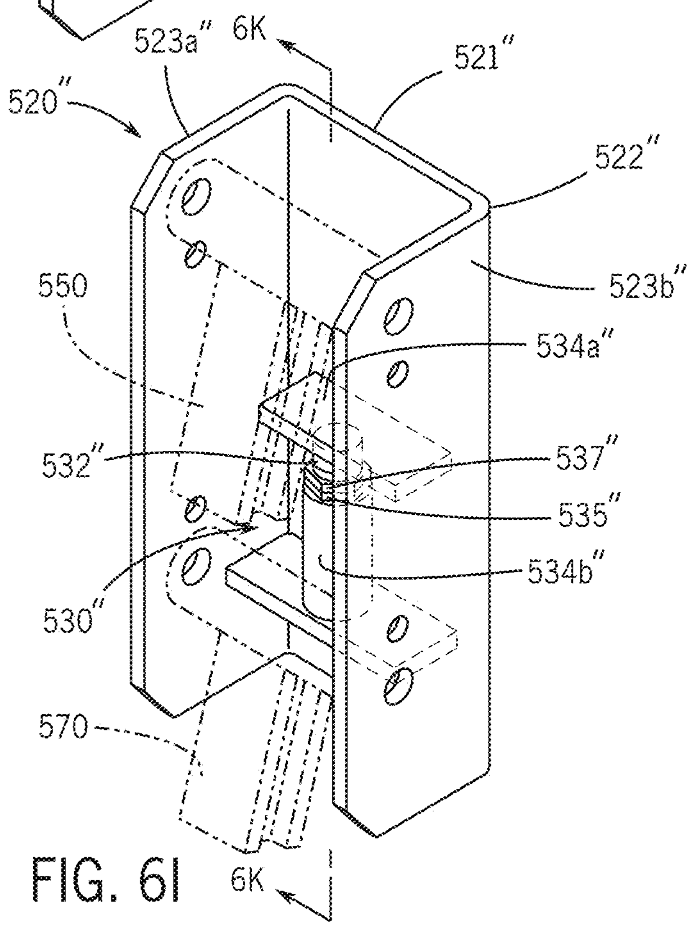
FIG. 6I depicts the example second coupling bracket of FIG. 6H with the example stop feature limiting travel of a parallel linkage of example parallel linkage.
Figure 6K:
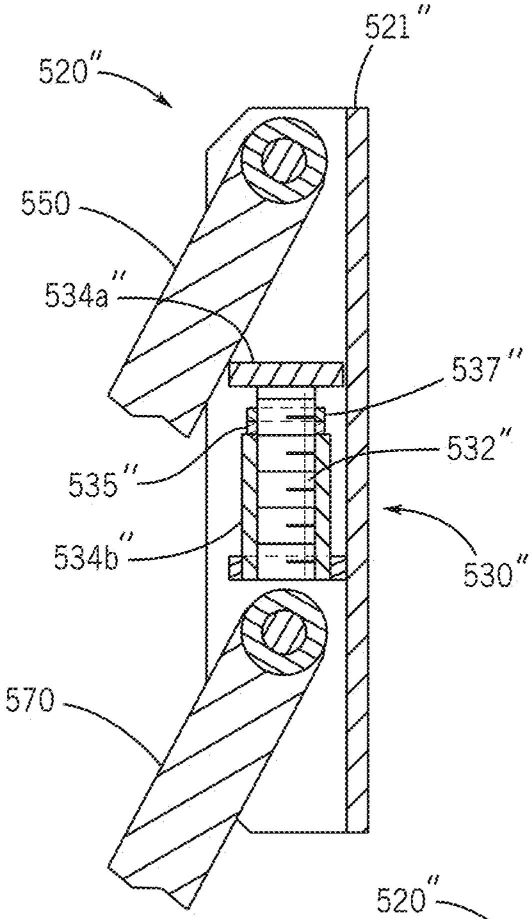
FIG. 6K depicts a cross-sectional view of the example second coupling bracket of FIG. 6I, taken along line 6K-6K of FIG. 6I.

The stop feature 530" may be selectively adjustable in order to define a limit to the travel of the linkages 550, 570. For example, and as shown in FIG. 6C, the linkages 550, 570 are shown (in dashed line) coupled to the second coupling bracket 520". In FIG. 6C, the stop feature 530" may be arranged with the threaded shaft 532" in a generally retracted configuration. In the position of FIG. 6C, the stop feature 530" may be positioned at an offset 536" relative to, for example, a bottom surface of the linkage 550. The offset 536" may represent a distance that the linkage 550 can generally move or rotate through prior to contacting the stop feature 530", such as contacting the landing 534*a*". For example, as shown in FIGS. 6I and 6K, the linkage 550 may rotate through the offset 536" and contact the stop feature 530" at or along the landing 534*a*".

Figure 6L:
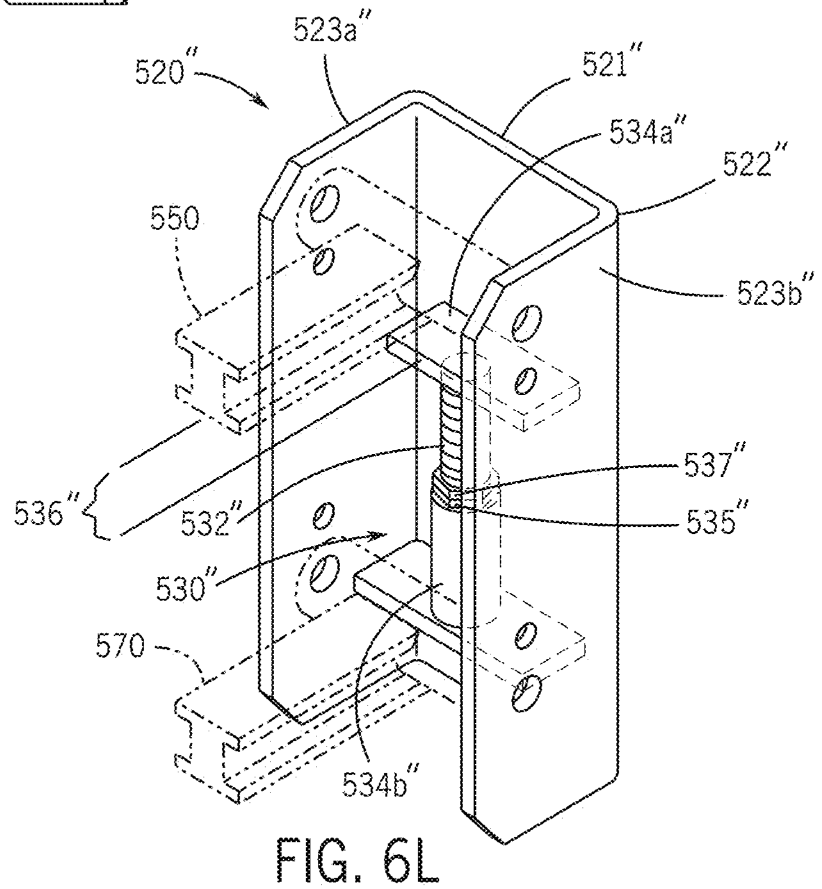
FIG. 6L depicts the second coupling bracket of FIG. 6H with the example stop feature in a second configuration.
Figure 6M:
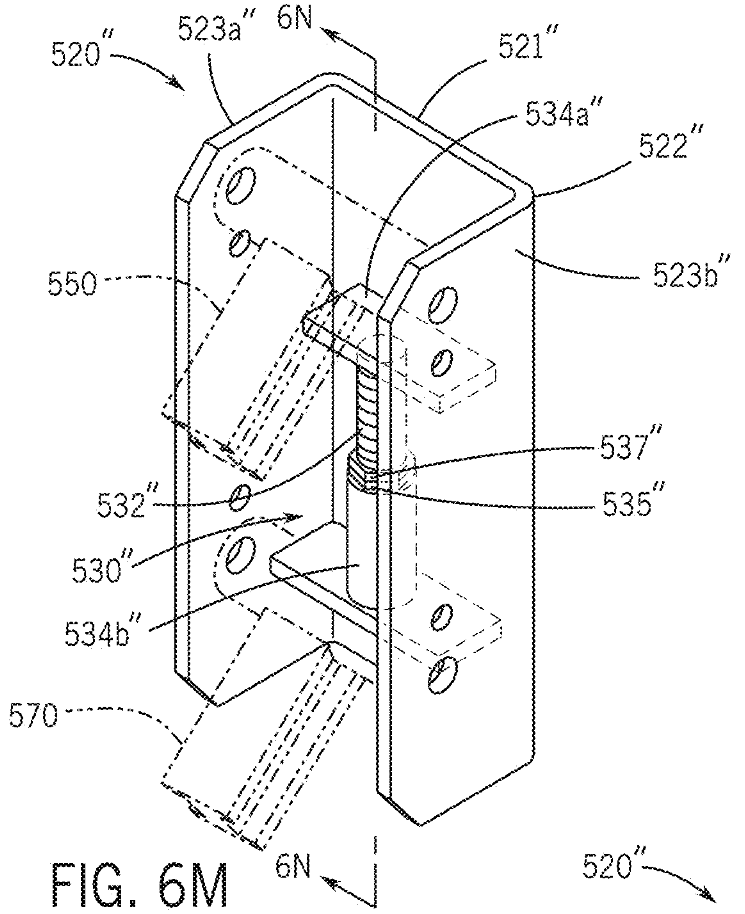
FIG. 6M depicts the example second coupling bracket of FIG. 6L with the example stop feature limiting travel of the parallel linkage.
Figure 6N:
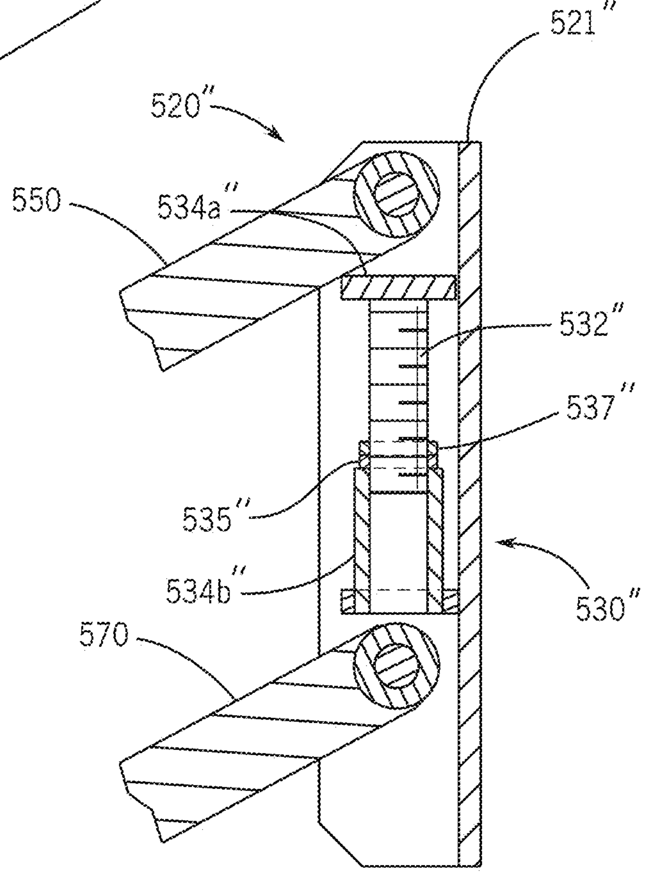
FIG. 6N depicts a cross-sectional view of the example second coupling bracket of FIG. 6M, taken along line 6N-6N of FIG. 6M.

A value of the offset 536" may be based on the selectively defined position of the threaded shaft 532". For example, and as shown in FIG. 6L, the stop feature 530" may be manipulated into a generally extended configuration and secured at the second, selectively defined position. As shown in FIG. 6L, the stop feature 530" may be in a generally extended configuration in which the upper landing 534*a*" is generally closer to the linkage 550 as compared to when the stop feature 530" is in the configuration of FIG. 6H. In this regard, the value of the offset 536" in the configuration of FIG. 6L may be less than the value of offset 536" in the configuration of FIG. 6H. In the configuration of FIG. 6L, the linkage 550 may therefore be permitted to travel a lesser amount (e.g., corresponding to the lesser value of the offset 536") as compared with configuration of FIG. 6H. For example, as shown in FIGS. 6M and 6N, the linkage 550 may rotate through the offset 536" and contact the stop feature 530" at or along the landing 534*a*", which may be a lesser amount of rotation compared to the rotation permitted with reference to the configuration of FIG. 6H. In this manner, the travel of the linkages 550, 570 may be adjusted by selectively manipulating the stop feature 530" between the generally extending and retracted configurations.

Any of the features, components, and/or parts, including the arrangements and configurations thereof shown in FIGS. 6H-6N can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6H-6N.

With respect to any of the examples described herein, the linkage assembly 500 may be coupled such that the parallel linkage 540 pivotally couples the first coupling bracket 510 and the second coupling bracket 520. For example, and with reference to FIGS. 3A-5, the first linkage 550 may be pivotally coupled with the first coupling bracket 510 and the second coupling bracket 520. In one example, the first pivot portion 558 of the first bracket 550 may be received by the U-shaped body 511 of the first coupling bracket 510. For example, the first pivot portion 558 may be positioned between the first wing side 513*a* and the second wing side 513*b*. The first pivot portion 558 may be arranged with the first coupling bracket 510 such that the axle passage 560 is generally aligned with the upper connection feature 517. The first linkage 550 may be secured to the first coupling bracket 510 using one or more axle components 545. For example, the rotational pin 546 of a sample axle component 545 may be advanced in the upper connection feature 517 and through the axle passage 560. In so doing, the axle component 545 may extend through axially aligned holes in both of the first side wing 513*a* and the second side wing 513*b*. The first linkage 550 may be substantially free to rotate about the rotational pin 546 and structurally supported by the first coupling bracket 510 via the engagement of the rotational pin 546 with the first and second side wings 513*a*, 513*b*. One or more fasteners may be used to secure the axle component 545 to the first coupling bracket 510 and prevent exit of the rotational pin 546 from the axially aligned holes of the first and second side wings 513*a*, 513*b*. For example, the fastener 549 may be advanced through the bolt hole 548 of the axle component 545 and the set hole 516 of the first coupling bracket 510 and secured therein such that fastener 549 secures axle components 545 to the first coupling bracket 510.

The first linkage 550 may also be pivotally coupled with the second coupling bracket 520. In one example, the second pivot portion 562 of the first bracket 550 may be received by the U-shaped body 521 of the second coupling bracket 520. For example, the second pivot portion 562 may be positioned between the first wing side 523*a* and the second wing side 523*b*. The second pivot portion 563 may be arranged with the second coupling bracket 520 such that the axle passage 564 is generally aligned with the upper connection feature 527. The first linkage 550 may be secured to the second coupling bracket 520 using one or more axle components 545, for example, substantially analogous to the coupling of the first pivot portion 558 and the upper connection feature 517.

The second linkage 570 may be pivotally coupled to the first coupling bracket 510 and the second coupling bracket 520 in a manner substantially analogous to the coupling of the first linkage 550 with the first and second coupling brackets 510, 520. For example, and as described herein, the second linkage 570 may be constructed similarly or identically to the first linkage 550, and also include, among other components, the first pivot portion 558, the axle passage 560, the second pivot portion 562, and the axle passage 564. Notwithstanding the foregoing similarities, the second linkage 550 may be pivotally coupled with the first and second coupling brackets 510, 520 and elevationally lower and generally parallel with the first linkage 550. For example, the first pivot portion 558 of the second linkage 570 may be pivotally coupled to the first coupling bracket 510 at the lower connection feature 515 using one or more axle components 545. Further, the second pivot portion 562 of the second linkage 570 may be pivotally coupled to the second coupling bracket 520 at the lower connection feature 525 using one more axle components 545.

The linkage assembly 500 may be further coupled such that the biasing assembly 580 operates to induce a down force on the second coupling bracket 520 (and components and/or subassemblies coupled thereto). For example, the pivot feature 583 may be pivotally coupled to the third pivot portion 566 of the first linkage 550 using the axle component 581. The third pivot portion 566 may be at least partially received by the U-shaped saddle 584 at the first end 585*a*. The third pivot portion 556 may be partially received by the U-shaped saddle 584 at the first end 585*a* such that the biasing mount passage 568 is axially aligned with corresponding holes of the U-shaped saddle 584. A pin and/or other axle component may be engaged through the axially aligned holes of the U-shaped saddle 584 and extend through the biasing mount passage 568. In this regard, the U-shaped saddle 584 and biasing element mount 582 more generally may be allowed to pivot relative to the first linkage 550.

The biasing assembly 580 may be further coupled such that the retention pin 588 sets an angular position of the biasing element mount 582 relative to the first linkage 550. For example, the retention pin 558 may be inserted through a hole of the series of graduated through holes 586, such as the hole 586*a*. The retention pin 588 may extend through each opposing side of the U-shaped saddle 584 such that that retention pin 588 define a stop within the U-shaped saddle 584. For example, the biasing element mount 582 may be pivotally coupled at the first end 585*a*. The biasing element mount 582 may be allowed to rotate relative to the third pivot portion 558 up to a stop position defining by the retention pin 588 in the U-shaped saddle 584. By selectively positioning in different holes of the plurality of graduate through holes 586, the biasing element mount 582 may be allowed more or less rotational movement, based on an elevation of the particular through hole with which the retention pin 588 is engaged.

Figure 8:
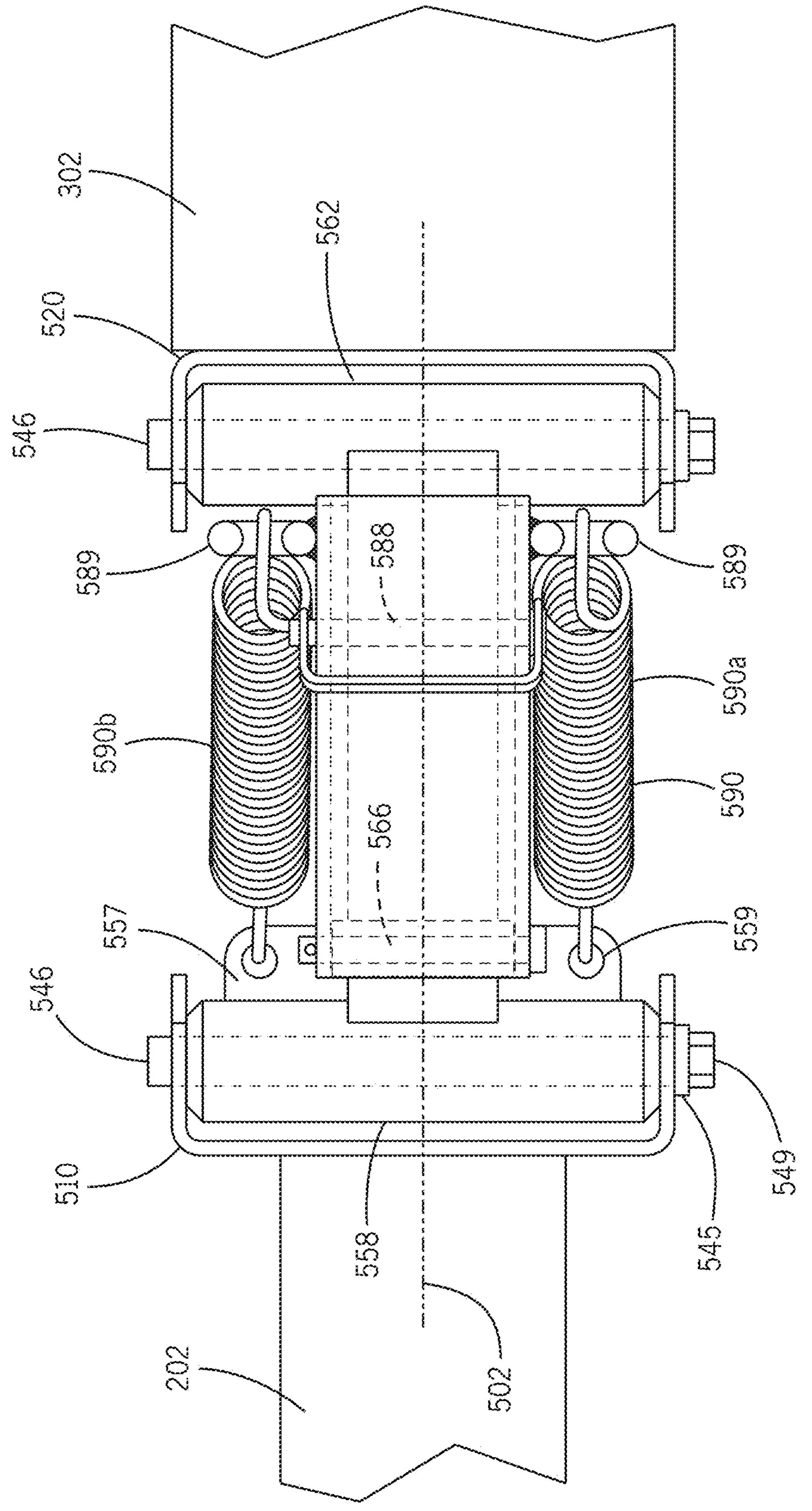
FIG. 8 depicts a top view of the example linkage assembly of FIG. 7B.

The biasing assembly 580 may be further coupled such that the biasing element 590 (and/or multiple biasing elements) is integrated with the parallel linkage 540. For example, the first end 594*a* of the biasing element 590 may be coupled to the biasing element mount 582 at the hook 589. Further, the second end 594*b* of the biasing element 590 may be coupled to the engagement features 559 of the second link 570. In some cases, and as shown in FIG. 8, multiple biasing elements may be used. For example, the biasing element 590 may be a first biasing element 590*a* connected to a first side of parallel linkage 540. Further, a second biasing element 590*b* may be used that is connected to a second side of the parallel linkage 550 in manner substantially analogous to the first biasing element 590*a*.

Figure 7A:
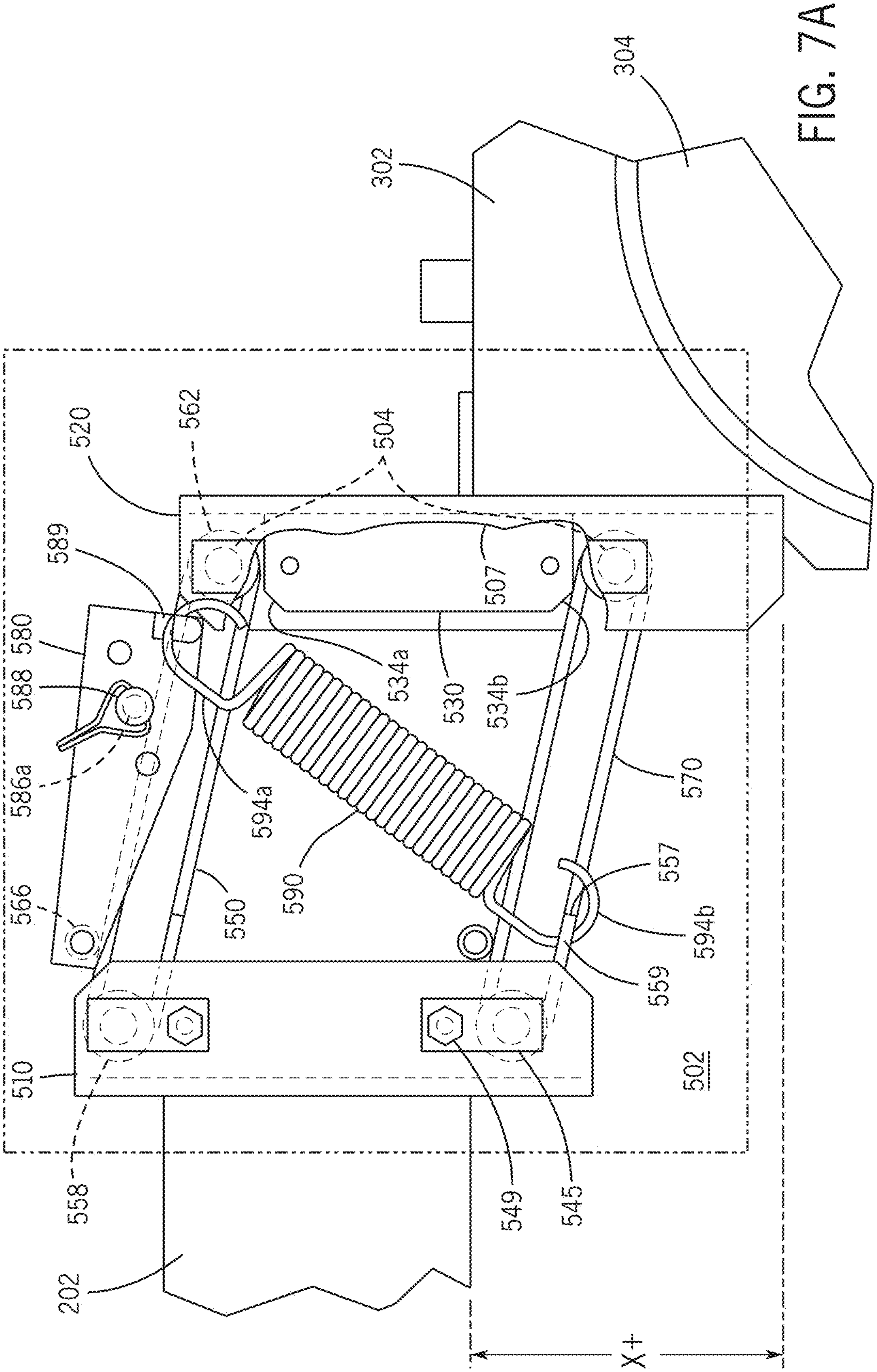
FIG. 7A depicts a side view of the example linkage assembly of FIG. 3B with the agriculture planter of FIG. 1 in a first configuration.
Figure 7B:
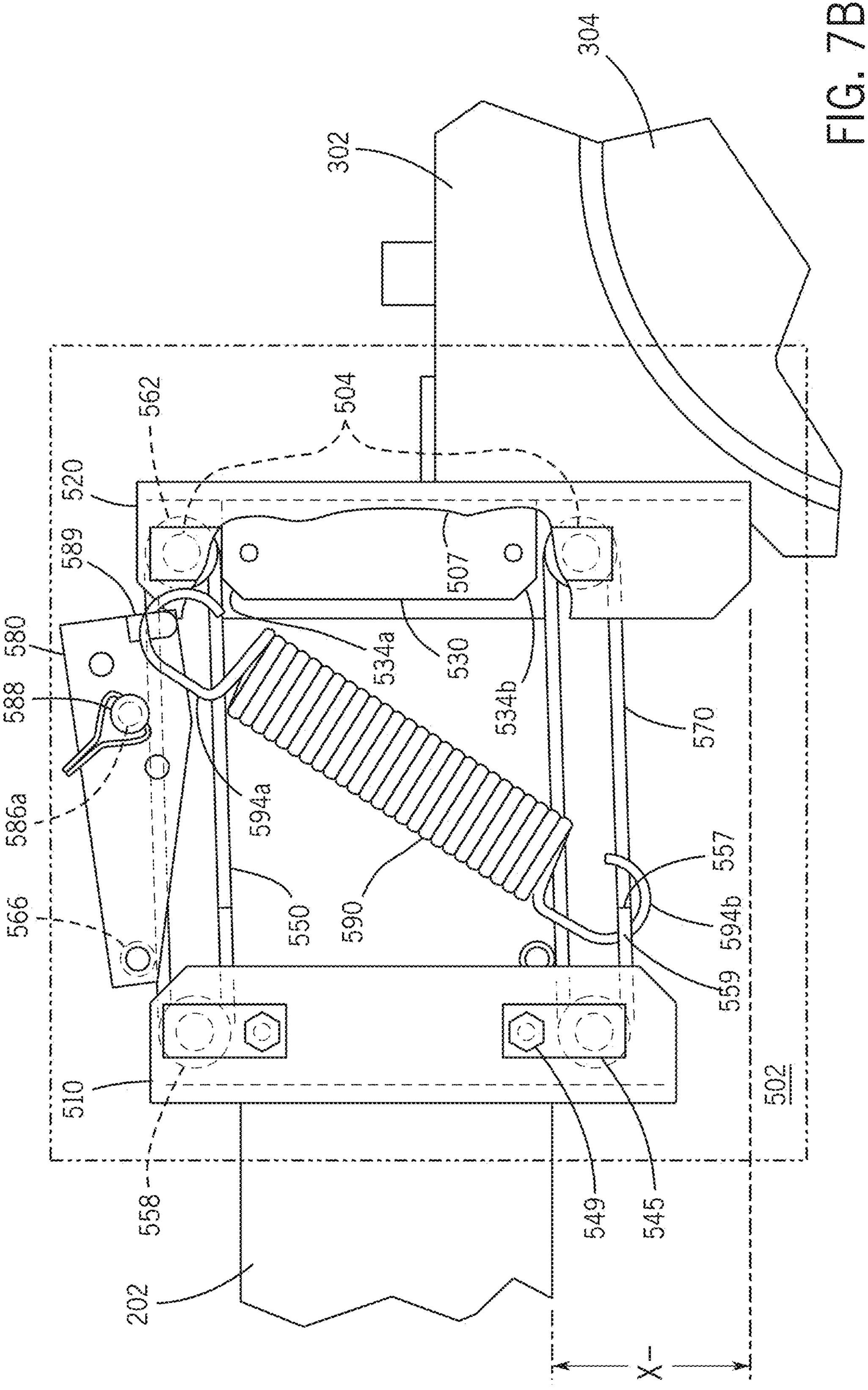
FIG. 7B depicts a side view of the example linkage assembly of FIG. 3B in a second configuration.

Turning to FIGS. 7A-8, an example implementation of the linkage assembly 500 is shown with the planter 70 of FIGS. 1-2B. For example, FIG. 7A depicts a side view of a linkage assembly 500 in a first configuration. In the example of FIG. 7A, the linkage assembly 500 may generally provide a mechanical connection between the opener assembly frame 202 and the closer assembly frame 302. The mechanical connection provided by the linkage assembly 500 may permit the relative, pivoting movement between the opener assembly frame 202 and the closer assembly frame 302. For example, the linkage assembly 500 may allow for relative pivoting movement between the opener assembly frame 202 and the closer assembly frame 302 from the first configuration of FIG. 3A to a second configuration, as shown in FIG. 7B. The linkage assembly 500 may permit the relative pivoting movement and define a maximum permitted travel of the coupled components between the first and second configurations of FIGS. 7A and 7B. For purposes of illustration, the implementation of the linkage assembly 500 is shown and described in relation to the opener assembly frame 202 and the closer assembly frame 302. In this regard, the linkage assembly 500 may be a component of a trailing assembly. In other examples, the linkage assembly 500 may be implemented with the planter 70 in another manner, such as at another location of the row unit of the planter 70.

For purposes of illustration, the linkage assembly 500 may be used to pivotally couple components associated with a front of the planter 70, including a row cleaner or trash wheel assembly arranged at a forward portion of the row unit. For example, the first coupling bracket 510 may be connected to a forward portion of a row unit, and the second coupling bracket 520 may be connected to one or more frames that are in turn mounted to a row cleaning or trash or debris cleaning wheel. The linkage assembly 500 may therefore be configured to permit the pivotal coupling and downforce biasing on the cleaning wheels in a manner substantially analogous to that described in relation to the closing wheels 360. Further, it will be appreciated that the parallel linkage 220 and/or the parallel linkage 320 may include, be associated with, and/or be defined by the structures of linkage assembly 500 described herein with reference to FIGS. 5-8. In other example, other parallel linkage assemblies may be used with the planter 70, such as those described below in relation to FIGS. 9A-15B.

To illustrate one operation, the biasing assembly 580 may be manipulatable to selectively apply a downforce to the second coupling bracket 520. For example, and as shown in FIG. 7A, the biasing element 590 may include the first end 594*a* at the biasing element mount 582 (and adjacent the second coupling bracket 520), and the second end 594*b* at the engagement feature 559 (and adjacent the first coupling bracket 510). Accordingly, the biasing element 590 may induce a downforce, using the coiled section 592 such that the biasing element 590 encourages the second coupling bracket 520 downward relative to the first coupling bracket 510. Further, the amount of downforce may be selectively controlled via operation of the retention pin 588. For example, the biasing element 590 may be deformed based in part on an angular position of the biasing element mount 582. As shown in FIG. 7A, the retention pin 588 may be engaged with the hole 586*a* of the plurality of through holes 586 in order to define the angular position of the biasing element mount 582. The angular position of the biasing element mount 582 may be changed by engaging the retention pin 588 in a different hole of the plurality of through holes 586. The engagement of the retention pin 588 in a different hole may cause the amount of downforce induced by the biasing element 590 to change. For example, broadly, the engagement of the retention pin 588 in an elevationally higher hole may reduce the downforce (to the extent that the biasing element 590 is deformed less), whereas the engagement of the retention pin 588 in an elevationally lower hole may increase the down force (to the extent that the biasing element 590 is deformed more).

In operation, the stop feature 530 may limit or otherwise define an amount of travel permitted by the first and second linkages 550, 570. For example, and as shown in FIG. 7A, the first and second linkage 550, 570 may be separated by an offset 504 and generally parallel to one another along the center longitudinal plane 502. The stop feature 530 may generally be positioned within the offset 504. As the first and second linkages 550, 570 pivot relative to the second coupling bracket 520 the flange portions (554*a*, 554*b*) may move relative to the stop feature 530. The first and second linkages 550, 570 may be permitted to pivot relative to the second coupling bracket 520 until the flange portions contact or otherwise engage the stop feature 530, such as a position in which the flange portions contact the upper and/or lower landings 534*a*, 534*b*.

In this regard, FIG. 7A shows the linkage assembly 500 in the first configuration described above in which the travel of the parallel linkages 540 is limited by the engagement of the second linkage 570 with the stop feature 530. With reference to FIG. 7B, the linkage assembly 500 is shown in the second configuration described above in which the travel of the parallel linkages is limited by the engagement of the first linkage 550 with the stop feature 530. In this manner, the linkage assembly 500 may permit the coupling or travel between the first configuration (FIG. 7A) and the second configuration (FIG. 7B). Where the stop feature 530 is adjustable, as described above with reference to FIGS. 6A and 6N, the first and second linkages 550, 570 may be permit to travel a greater or lesser amount, based on a selectively defined position of the stop feature 530.

In this way, the linkage assembly 550 allows relative travel up and down between the opener assembly frame 202, or any other component of the assembly to which the first bracket 510 is coupled, and the closer assembly frame 302, or any other component of the assembly to which the second bracket 520 is coupled. As shown in FIG. 7A, the position of the stop feature 530 limits the displacement of the closer assembly frame 302 below the opener assembly frame 202 to a maximum displacement X+. FIG. 7B shows the minimum displacement X− of the closer assembly frame 302 below the opener assembly frame 202 based on the position of the stop feature 530. The magnitude of the maximum displacement X+ and the minimum displacement X−, shown in FIGS. 7A and 7B, respectively, can be changed based on the position and size of the stop feature 530.

Any of the features, components, and/or parts, including the arrangements and configurations thereof shown in FIGS. 3A-8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3A-8.

While FIGS. 3A-8 show the linkage assembly 500 including the biasing assembly 580 having a mechanical spring as the biasing element 590, one or more other examples can additionally or alternatively include electromechanical actuators to selectively apply downforce to the parallel linkage. In this regard, FIGS. 9A-15B depict an example linkage assembly 900 including a biasing assembly 980. The biasing assembly 980 may broadly be configured to apply a downforce to one or more coupling brackets of the linkage assembly 900, using an actuator, such as an electromechanical actuator. For purposes of illustration, the linkage assembly 900 is shown in FIGS. 9A-15B as including, a first coupling bracket 910, a second coupling bracket 920, a parallel linkage 940, a first linkage 950, a second linkage 970, and the biasing assembly 980. The linkage assembly 900 may substantially similar and functionally analogous to the linkage assembly 500 of FIGS. 3A-8. For example, the first coupling bracket 910 may be configured for mounting to the planter 70 or a first subassembly of the trailing arm assembly 100.

Further, the second coupling bracket 920 may be configured for mounting with a second subassembly of the trailing arm assembly 100. The parallel linkage 940 may pivotally couple with the first and second coupling brackets 910, 920 and be disposed on, such as being centered on, a center longitudinal plane of the linkage assembly 900. Further, the biasing assembly 980 may be coupled with the parallel linkage 940 and be manipulatable to selectively apply a downforce to the second coupling bracket 920. In this regard, it will be appreciated that the linkage assembly 900 may be used with the planter 70 and trailing arm assemblies 100 of FIGS. 1 and 2, such as being associated with and/or defining and/or being the parallel linkages 220, 320.

Figure 10:
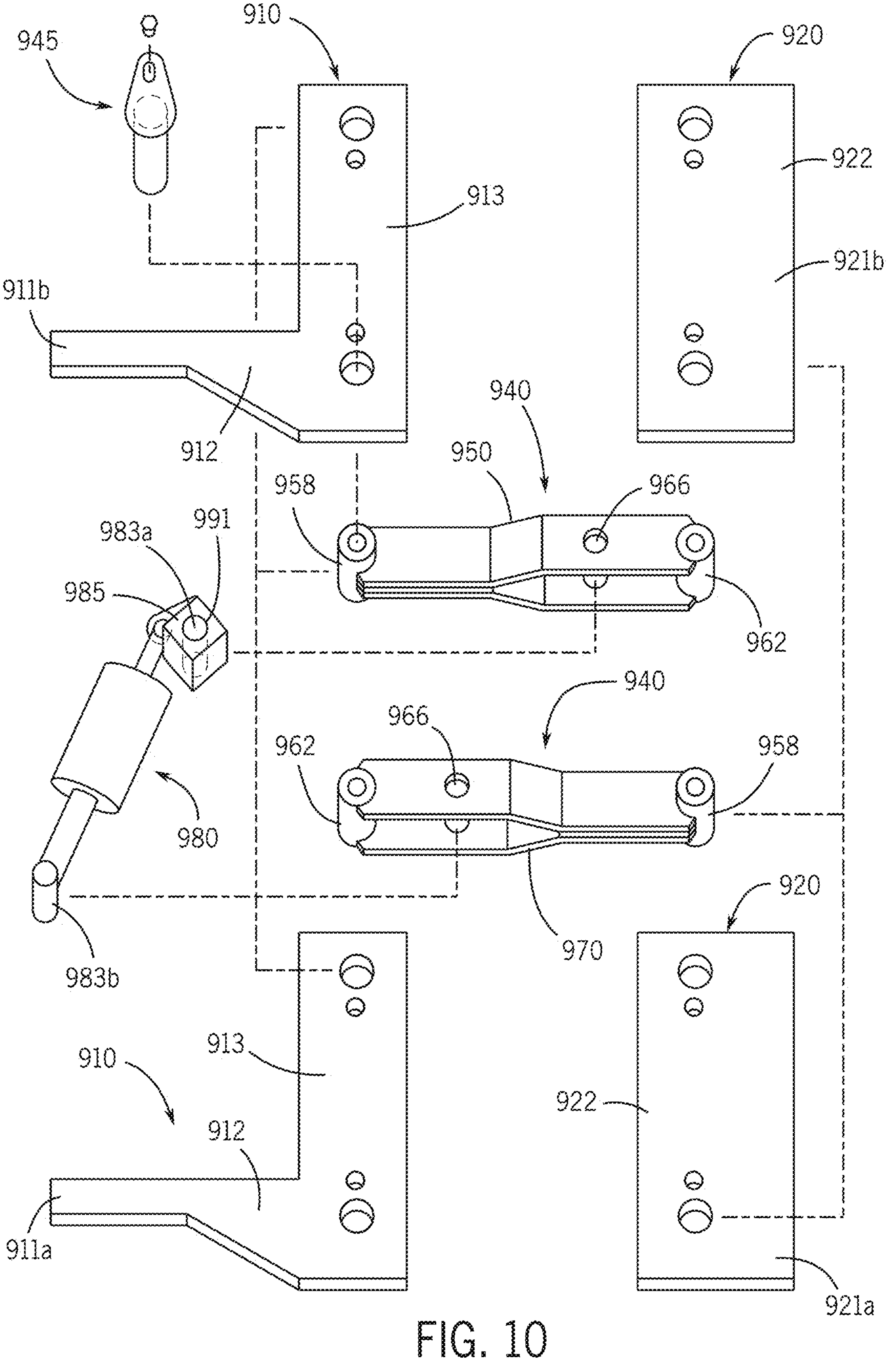
FIG. 10 depicts an exploded view of the example linkage assembly of FIG. 9A.
Figure 11A:
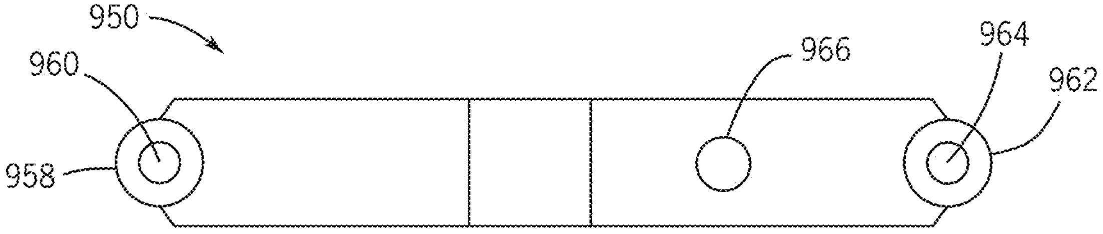
FIG. 11A depicts a side view of a linkage of the example linkage assembly of FIG. 9A.
Figure 11B:
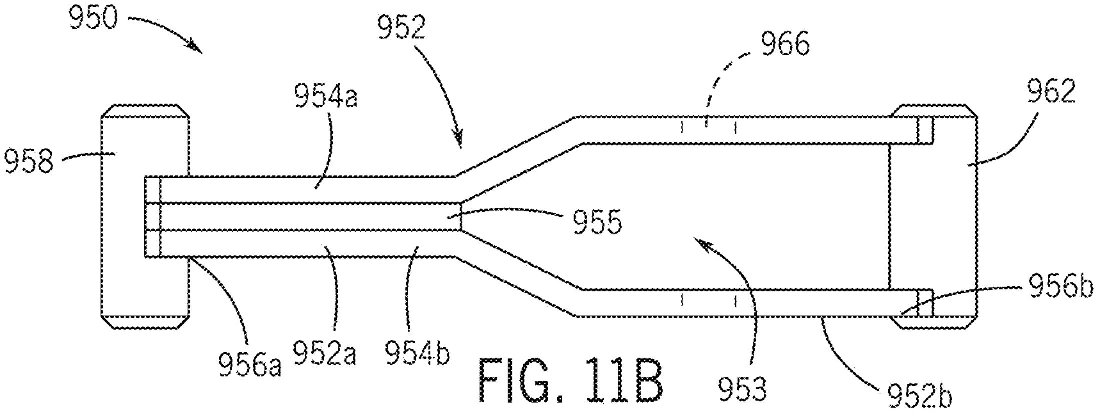
FIG. 11B depicts a top view of the example linkage of FIG. 11A.
Figure 12:
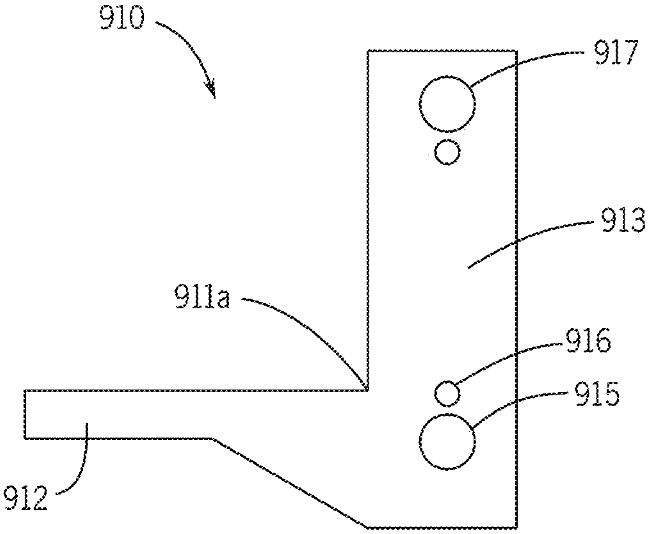
FIG. 12 depicts a side view of a first coupling bracket of the example linkage assembly of FIG. 9A.

Notwithstanding the foregoing similarities, the first coupling bracket 910 may include a first plate 911*a* and a second plate 911*b*. As shown in FIGS. 10 and 12, each of the first and second plates 911*a*, 911*b* may include a mount section 912 and a parallel linkage section 913. The mount section 912 may be configured for engagement with the planter 70 and/or a subassembly of the trailing arm assembly 100. The mount section 912 may be configured for pivotal coupling with the parallel linkage 940 and define, among other components, a lower connection feature 915, set holes 916, and an upper connection feature 917, substantially analogous to the lower connection feature 515, set holes 516, and the upper connection feature 517 shown in FIG. 5.

Figure 13:
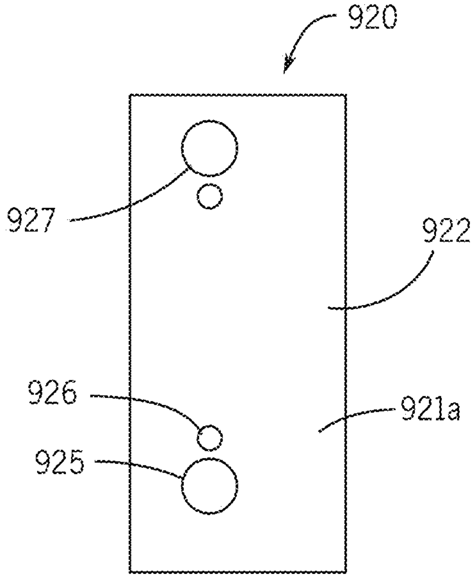
FIG. 13 depicts a side view of a second coupling bracket of the example linkage assembly of FIG. 9A.
Figure 14:
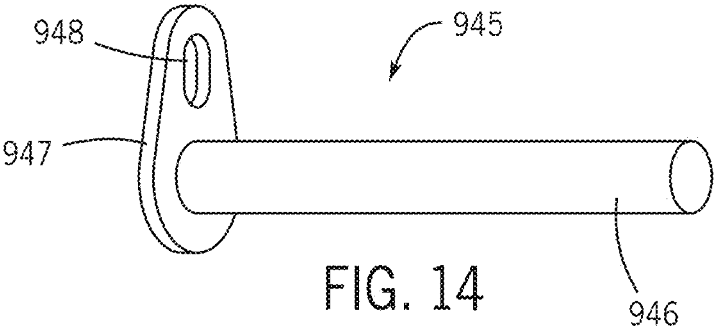
FIG. 14 depicts an isometric view of a retaining pin of the example linkage assembly of FIG. 9A.

Further, the second coupling bracket 920 may include a first plate 921*a* and a second plate 921*b*. As shown in FIGS. 10 and 13, each of the first and second plates 921*a*, 921*b* may be configured for pivotal coupling with the parallel linkage 940 and define, among other components, a lower connection feature 925, set holes 926, and an upper connection feature 927, substantially analogous to the lower connection feature 525, set holes 526, and the upper connection feature 527. The linkage assembly 900 may also include one or more connection features 945, as shown in FIGS. 10 and 14. The connection features 945 may be substantially analogous to the connection features 545 shown and described in FIG. 5 and include a retention pin 946, a stop plate 947, and a bolt hole 948.

With reference to FIGS. 9A-11B, the parallel linkage 940 is shown as including the first linkage 950 and the second linkage 970. The first and second linkages 950, 970 may be the same or similar components. Each of the first and second linkages 950, 970 may be configured to engage the biasing assembly 980, such as engaging ends or sections of an electromechanical actuator. In this regard, while the first linkage 950 is now described herein below, it will be appreciated that the second linkage 970 may include the same or similar components, features, and functionalities as the first linkage 950.

The first linkage 950 may include a beam portion 952, and a first pivot portion 958 and a second pivot portion 962 at opposing ends of the beam portion 952. The beam portion 952 may generally include a reinforced section 952*a* and an actuator section 952*b*. For example, the beam portion 952 may include a first flange portion 954*a* and a second flange portion 954*b*. As shown in the top view of FIG. 11B, the first and second flange portions 954*a*, 954*b* may cooperate to define a tuning fork or wishbone-type shape. At the reinforced section 952*a*, the first and second flange portions 954*a*, 954*b* may be connected to one another by a web 955.

At the actuator section 952*b*, the first and second flange portions 954*a*, 954*b* may be separated from one another and define an actuator coupling region 953. Further, the first and second flange portions 954*a*, 954*b* may cooperate to define an actuator coupling feature 966 at the actuator section 952*b*. For example, each of the first and second flange portions 954*a*, 954*b* may include axially aligned through holes at the actuator section 952*b* that are configured to receive a coupling or axle feature for pivotal engagement of an actuator with the first linkage 950.

The beam portion 952 may be coupled to the first pivot portion 958 at a first end 956*a*. The first pivot portion 958 may be substantially analogous to the first pivot portion 558, and include an axle passage 960. Further, the beam portion 952 may be coupled to the second pivot portion 962 at a second end 956*b*. The second pivot portion 962 may be substantially analogous to the second pivot portion 562, and include an axle passage 964.

The biasing assembly 980 may be configured to selectively apply a downforce on the second coupling bracket 920 using a linear actuator 981. The linear actuator 981 may include an electro-mechanical, screw-drive linear actuator. For example, the linear actuator may be an actuator of various configurations that use an electric motor to convert rotary motion into linear displacement. In one example, the linear actuator may include a configuration in which a threaded lead screw is engaged with a nut having corresponding threads. The lead screw may be rotated axially by operation of an associated electric motor. The rotation of the lead screw may drive the nut along the axial length of the lead screw. The nut may be fixedly engaged with an external shaft, thrust tube, casing or other component that may be driven axially, reciprocally based on the advancement of the nut along the lead screw. It will be appreciated that the substantially any other arrangement of mechanical mechanisms may be used to facilitate the conversion of rotary motion from the electric motor to linear motion of a shaft or tube, including other screw-type mechanisms, such as ball screws, roller screws and so on. Wheel and axle type combinations may be used in other examples in which a wheel component rotates in order to produce linear motion from a belt or chain. Additionally or alternatively, cam-based linear actuator may be used, particular for low-travel applications. Control signals sent to the linear actuator 981 through a control wire bundle may direct the internal mechanical drive mechanism to extend or retract a shaft 982. Uniform control signals can be sent to each linear actuator 981 of each row assembly on the planter 70 or the control software can send individual control signals with separate direction to each of the linear actuators 981 on the planter 70.

Figure 15A:
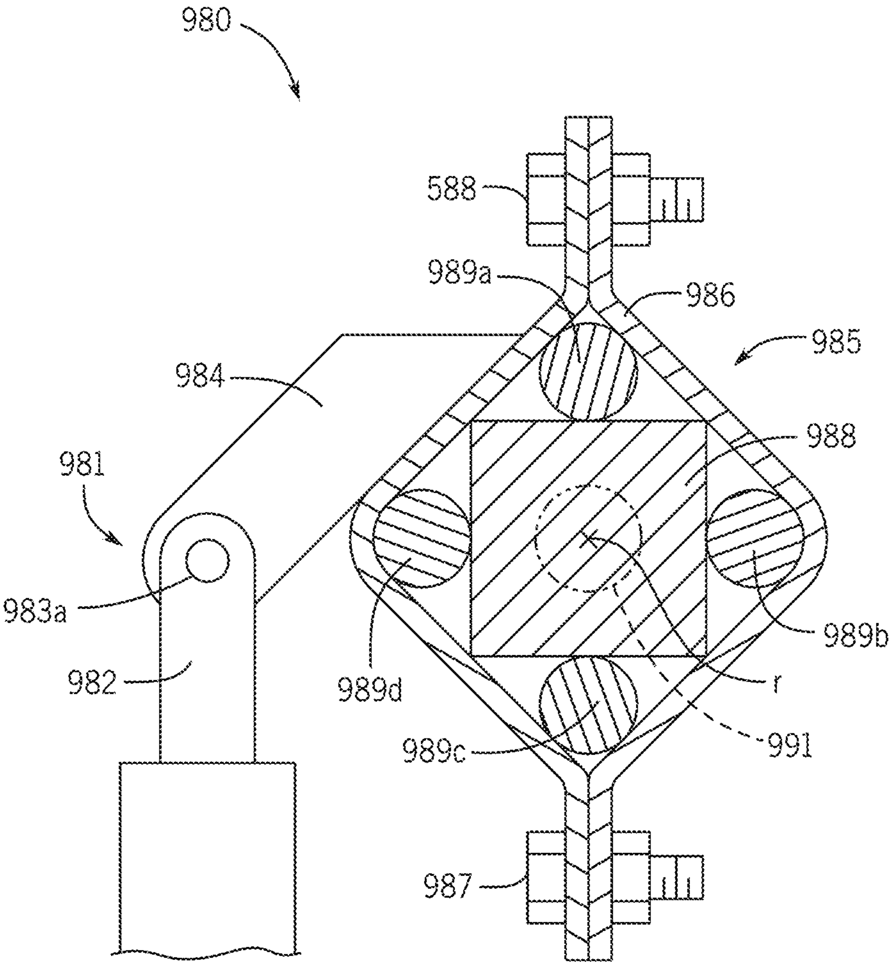
FIG. 15A depicts a cross-section view of a torsion axle of the example linkage assembly of FIG. 9A, taken along line 15-15 of FIG. 9B, and in a first configuration.
Figure 15B:
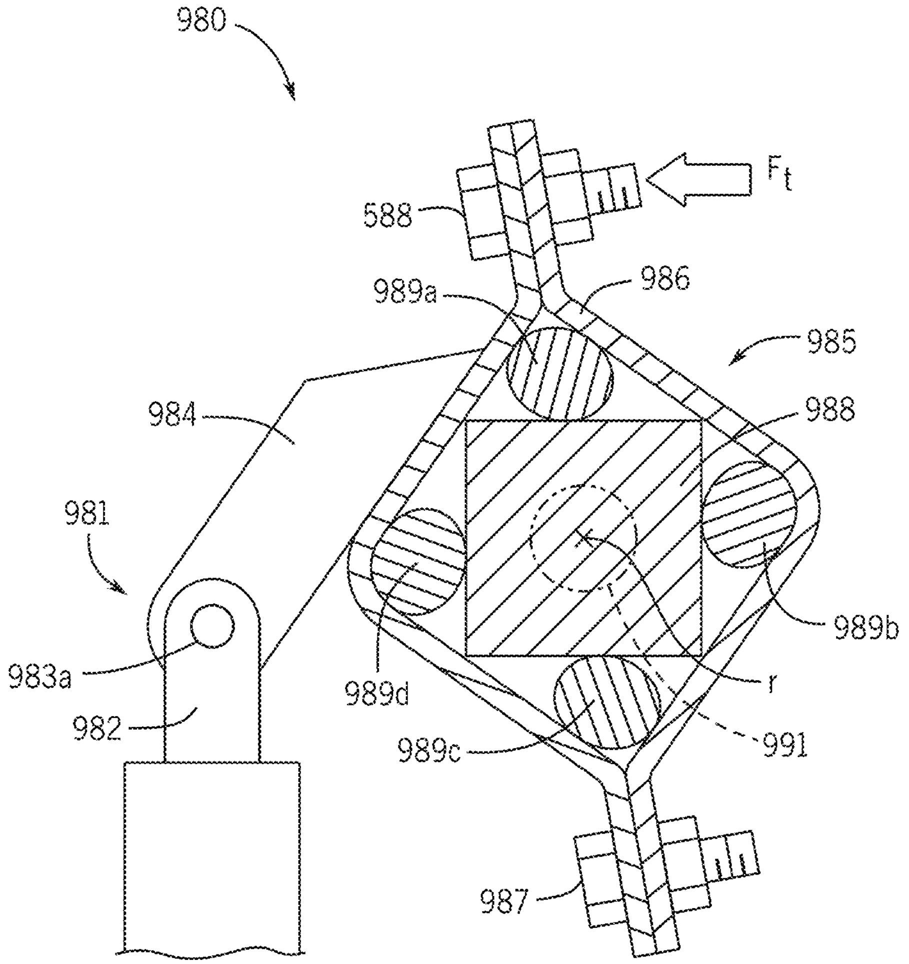
FIG. 15B depicts a cross-sectional view of the torsion axle of FIG. 15B in a second configuration.

Use of a linear actuator 981 may provide a number of benefits over the prior art biasing mechanisms such as springs or hydraulic or pneumatic rams. Significant benefits include faster response time, smart and prescriptive control of furrow closing assemblies from the tractor cab, individual force control on a row-by row basis, immediate feedback for force adjustment, control of extension length of the screw post in the actuator, and ability to lift the furrow closing assembly over obstacles among others. In this regard, the linear actuator 981 may be used to control downforce with respect to individual furrow closing assemblies of an example planter. The individual force control may provide for more consistent downforce by adjusting the force in response to real-time field conditions. For example, and as described herein, a load cell or other measurement or feedback device may be integrated with the linear actuator 981. The load cell may be configured to detect a change in force at linkage assembly 900 (e.g., at the linear actuator 981), such as due to a change in contour of the field or other field conditions. In turn, the linear actuator 981 may be adjusted, in some cases, automatically, in order to exert more or less force on the associated coupling bracket. The linear actuator 981 therefore may be used to maintain a relative consistent or constant downforce on associated coupling bracket To facilitate the foregoing, the biasing assembly 980 may further include a torsion axle 985, as shown in FIGS. 10 and 15A. The linear actuator 981 may be coupled to the parallel linkage 940 via the torsion axle 985, which is shown in more detail in FIGS. 15A and 15B. In one example, the torsion axle 985 may be formed about a torsion block 988 coupled fixedly to the first linkage 550 within the first actuator coupling region 953, shown in FIG. 11B. The torsion block 988 may be a piece of square steel block or square steel tube welded or otherwise connect at each end to the first linkage 950. The torsion block 988 may be coupled with or integrally formed with coupling sections 991 at opposing ends of the torsion block 588. The coupling sections 991 may be substantially cylindrical protrusion extending from each side of the torsion block 988 that are configured to facilitate coupling of the torsion block 988 to at least one of the linkages 950, 970 of the parallel linkage 940. Further, torsion biasing members 989*a*-989*d* may be positioned on each flat side of the torsion block 988. Exemplary torsion biasing members 989*a*-989*d* may be hard rubber cylinders or similar dense, elongated elastomeric bumpers arranged about and along the walls of the torsion block 988.

The torsion biasing members 989*a*-989*d* may be held in place by a torsion case 986 formed as a steel tube of square cross section surrounding the torsion biasing members 989*a*-989*d* and the torsion block 988. The walls of the torsion case 986 may be parallel to the walls of the torsion block 988. In one implementation, the torsion case 986 make be formed by two pieces of angle steel with pieces of flat steel welded to the long edges of the angle steel to form flanges. Corresponding case fasteners 588, 987, e.g., steel bolts, may be placed through the through holes to hold the two halves of the torsion case 986 together. The torsion case 986 thus holds the torsion biasing members 989*a*-989*d* tightly, but with minimal pre-loaded compression, against the walls of the torsion block 988. The square cross-section perimeter of the torsion case 986 formed by the walls of angle steel is this larger than the square perimeter of the torsion block 988 and the torsion case 986 thus fits concentrically about the torsion block 988 as shown in FIG. 15A.

The arrangement of the torsion case 986, biasing members 989*a*-989*d*, and torsion block 988 may permit relative movement between the torsion case 986 and the torsion block 988 about an axis r, as shown in FIG. 15A. For example, the torsion block 988 may be fixed to the first linkage 950 and define the axis r. The biasing members 989*a*-989*d* may be arranged about the torsion block 988 and the axis r. The torsion case 986 may be clamped around the biasing members 989*a*-989*d*, as described herein. The torsion case 986 may be clamped around the biasing members 989*a*-989*d* such that the torsion case 986 and the torsion block 988 may rotate relative to one another about the axis r in response to a force input. The biasing members 989*a*-989*d* may impede or prevent such relative rotation based, in part, on the elastic characteristics of the biasing members 989*a*-989*d*. In this regard, the torsion axle 985 may provide damping or flexibility in the system between the parallel linkage 940 and the actuator 981. For example, the linear actuator 981 may be connected to the torsion case 986 via a coupler plate 984 and exert a force on the parallel linkage 940 via the torsion axle 985. The relative movement of the torsion case 986 and the torsion block 988 permitted by the biasing members 989*a*-989*d* may allow for variation in force received at the parallel linkage 940 (e.g., due to an abrupt grade change, field debris, or the like) to be absorbed at least partially by the torsion axle 985 (and biasing members 989*a*-989*d*) as opposed to encountering rigid resistance at the shaft of the linear actuator 981.

Figure 9A:
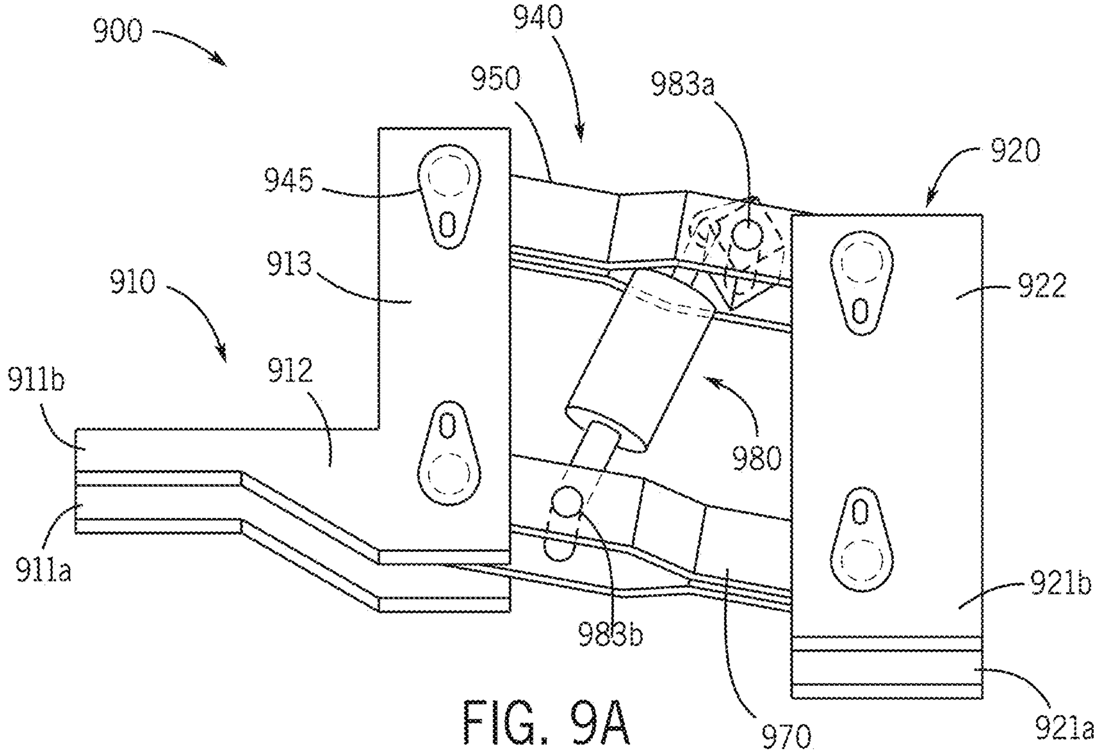
FIG. 9A depicts a side view of another example linkage assembly in a first configuration.

With reference to FIG. 9A, the first and second linkages 950, 970 may be coupled in the linkage assembly 900 in a manner substantially analogous to the coupling of the first and second linkages 550, 570 described herein with reference to FIGS. 3A-8. For example, the first linkage 950 may be pivotally coupled with the first coupling bracket 910 via the upper connection feature 917 and the first pivot portion 958. Further, the first linkage 950 may be pivotally coupled with the second coupling bracket 920 via the upper connection feature 927 and the second pivot portion 962. Further, the second linkage 970 may be pivotally coupled with the first coupling bracket 910 via the lower connection feature 915 and the first pivot portion 958. Further, the second linkage 970 may be pivotally coupled with the second coupling bracket 920 via the lower connection feature 925 and the second pivot portion 962.

The biasing assembly 980 may be coupled with the parallel linkage 940 such that the actuator 981 induces or applies a downforce to the second coupling bracket 920. For example, a first end 983*a* of the actuator 981 may be coupled to the first linkage 950 and a second end 983*b* of the actuator 981 may be coupled to the second linkage 970. For example, the second end 983*b* of the actuator 981 may be pivotally coupled to the second linkage 970 in a second actuator coupling region 953 that is defined by the second linkage 970. In some cases, a pin or axle or other feature may be disposed extending across the second actuator coupling region and the second end 983*b* may be permitted to rotate relative to the pin. In other cases, other configurations are contemplated. The first end 983*a* may be coupled to the first linkage 950 via the torsion axle 985. For example, the shaft 982 may be pivotally coupled to the coupler plate 984 of the torsion axle 985, as described above. The coupling sections 991 of the torsion axle 985 may be fitted in and secured to the actuator coupling feature 966 of the first linkage 550 in order to couple the shaft 982 to the parallel linkage 940 via the torsion axle 985.

Figure 9B:
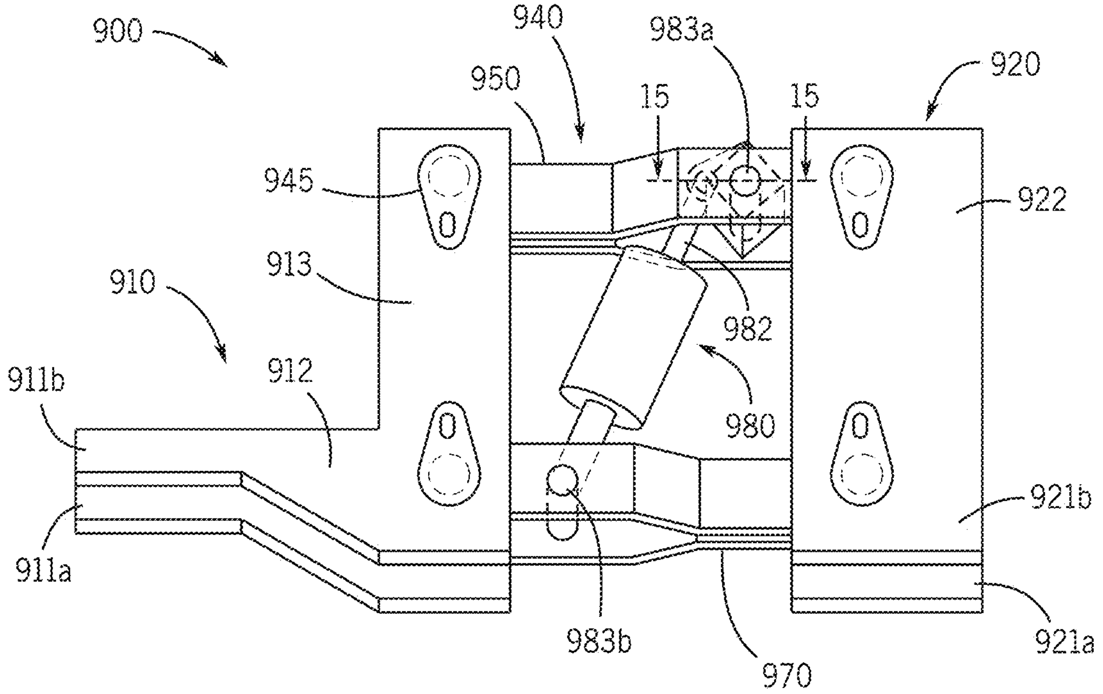
FIG. 9B depicts a side view of another example linkage assembly in a second configuration.

In operation, the actuator 981 may execute one or more internal electromechanical functions such that the shaft 982 causes the ends 983*a*, 983*b* to move relative to one another. The movement of the ends 983*a*, 983*b* relative to one another may change amount of force applied across the first and second linkages 950, 970. As shown in FIG. 9A, the second end 983*b* is connected to the second linkage 970 adjacent the first coupling bracket 910. Further, the first end 983*b* is connected to the first linkage 950 adjacent the second coupling bracket 920. FIG. 9A shows a first configuration in which the second coupling bracket 920 is elevationally lower than the first coupling bracket 910. In FIG. 9B, the second coupling bracket 920 is shown in a second configuration in which the second coupling bracket 920 is elevation higher than the first coupling bracket 910. For example, the actuator 981 may operate to move the ends 983*a*, 983*b* relative to one another. The actuator 981 may therefore encourage movement of the second coupling bracket 920 relative to the first coupling bracket 910, which may, in turn, induce a downforce on the second coupling bracket 920.

It will be appreciated that during operation the torsion axle 985 may provide flexibility and damping for the linear actuator 981 for a range of linear extensions of the shaft 982. For example, and with reference to FIG. 15B, the linear actuator 981 is shown with the shaft 982 in a retracted position as compared to the arrangement of FIG. 15A. The torsion axle 985 may be rotated, as a unit, about the axis r, as a result of the retracted position of the shaft 982. The torsion axle 580 may twist or rotate about the axis r relative to one another under the additional load (Ft), and thereby cause the torsion biasing members 989*a*-989*b* to deform. This may impart damping or flexibility into the system that may reduce the potential for damage to the linear actuator 540 and, more generally, facilitate the conformance of the closing wheels and/or other implements to the field as changes in contours and the like are encountered.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A linkage assembly for a trailing arm assembly, the linkage assembly comprising:

a first coupling bracket configured for mounting to a planter or first subassembly of the trailing arm assembly;

a second coupling bracket configured for mounting with a second subassembly of the trailing arm assembly;

a parallel linkage pivotally coupling the first coupling bracket and the second coupling bracket and disposed on a center longitudinal plane of the linkage, the center longitudinal plane bisecting the first coupling bracket and the second coupling bracket, the parallel linkage comprising a first linkage and a second linkage, each of the first linkage and the second linkage pivotally coupling the first coupling bracket and the second coupling bracket to one another; and a biasing assembly coupled with the parallel linkage and manipulatable to selectively apply a down force to the second coupling bracket;

wherein:

the first linkage and the second linkage are separated by a fixed space at the second coupling bracket;

the linkage assembly further comprises a stop feature coupled to the second coupling bracket and arranged within the fixed space, the stop feature being configured to define a travel of the first linkage and second linkage along the center longitudinal plane; and the stop feature is adjustable relative to the second coupling bracket in order to selectively define a limit of an amount of the travel of the first linkage and the second linkage along the center longitudinal plane.

2. The linkage assembly of claim 1, wherein:

the biasing assembly comprises:

a biasing element mount pivotally coupled to the first linkage; and a biasing element having a first end coupled to the second linkage and a second end coupled to the biasing element mount.

3. The linkage assembly of claim 2, wherein the biasing element mount comprises a U-shaped saddle configured to receive a side portion of the first linkage, wherein the U-shaped saddle includes:

a first saddle end configured to pivotally couple with the first linkage; and a second saddle end, opposite the first saddle end, configured to engage the biasing element.

4. The linkage assembly of claim 3, wherein:

the U-shaped saddle defines a series of graduated through holes adjacent the second saddle end and extending generally perpendicular to the center longitudinal plane; and the biasing assembly further comprises a retention feature selectively engageable with at least one hole of the series of graduated holes in order to define an angular position of the U-shaped saddle relative to the first linkage.

5. The linkage assembly of claim 2, wherein the biasing element comprises a hydraulic cylinder assembly.

6. The linkage assembly of claim 2, wherein the biasing element comprises an air cylinder assembly.

7. The linkage assembly of claim 1, wherein:

the second coupling bracket defines a track; and the stop feature comprises:

a stop body; and a fastener received in and movable relative to the track and engaging the stop body.

8. The linkage assembly of claim 7, the stop feature comprising:

a lower landing having a fixed position relative to the second coupling bracket; and an upper landing selectively adjustable relative to the lower landing and the second coupling bracket.

9. The linkage assembly of claim 1, wherein the parallel linkage comprises the first linkage having:

an I-beam portion; and a first pivot portion and a second pivot portion disposed at opposing ends of the I-beam portion, the first pivot portion configured to pivotally couple with the first coupling bracket and the second pivot portion configured to pivotally couple with the second coupling bracket.

10. The linkage assembly of claim 9, wherein the first linkage comprises a third pivot portion coupled with the I-beam portion and configured for rotational engagement with the biasing assembly.

11. The linkage assembly of claim 1, wherein the parallel linkage comprises the first linkage having:

a reinforced section including a first flange portion and a second flange portion connected by a web; and an actuator section including the first flange portion and the second flange portion separated from one another to define an actuator coupling region.

12. A linkage assembly for a trailing arm assembly, the linkage assembly comprising:

a first coupling bracket configured for mounting to a planter or first sub-assembly of the trailing arm assembly;

a second coupling bracket configured for mounting with a second subassembly of the trailing arm assembly;

a parallel linkage pivotally coupling the first coupling bracket and the second coupling bracket and disposed on a center longitudinal plane of the linkage, the center longitudinal plane bisecting the first coupling bracket and the second coupling bracket, the parallel linkage comprising a first linkage and a second linkage, each of the first linkage and the second linkage pivotally coupling the first coupling bracket and the second coupling bracket to one another by pivotal connections;

an actuator coupled with the parallel linkage and manipulatable to selectively apply a down force to the second coupling bracket; and a stop feature coupled to the second coupling bracket and between the first linkage and the second linkage, the stop feature being adjustable within and movable along the center longitudinal plane relative to the second coupling bracket to selectively define a limit of an amount of travel of the first linkage or the second linkage relative about the pivotal connections.

13. The linkage assembly of claim 12, wherein the actuator comprises a screw-driven linear actuator.

14. The linkage assembly of claim 12, wherein:

the parallel linkage comprises the first linkage having a first actuator coupling region and the second linkage having a second actuator coupling region;

the first linkage pivotally coupling the first coupling bracket and the second coupling bracket to one another with the first actuator coupling region adjacent the second coupling bracket;

the second linkage pivotally coupling the first coupling bracket and the second coupling brackets to one another with the second actuator coupling region adjacent the first coupling bracket; and the actuator includes a first end coupled to the first linkage in the first actuator coupling region and a second end coupled to the second linkage in the second actuator coupling region.

15. The linkage assembly of claim 14, wherein:

the linkage assembly further comprises a torsion axle fixed to the first linkage at the first actuator coupling region;

the first end of the actuator is pivotally attached to the torsion axle; and the torsion axle is configured to allow travel between the first end of the actuator and the first linkage.

16. A linkage for a trailing arm assembly, the linkage assembly comprising a first coupling bracket configured for mounting to a planter or first sub-assembly of the trailing arm assembly;

a second coupling bracket configured for mounting with a second subassembly of the trailing arm assembly;

a parallel linkage including a first linkage and a second linkage, the first linkage and the second linkage pivotally coupling the first coupling bracket and the second coupling bracket and coupled to the first coupling bracket and the second coupling bracket by pivotal connections;

a biasing element mount pivotally coupled to the first linkage;

a biasing element having a first end coupled to the second linkage and a second end coupled to the biasing element mount; and a stop feature adjustably secured to the second coupling bracket and between the first linkage and the second linkage, the stop feature being movable relative to a center longitudinal plane configured to selectively limit an amount of the travel of the first linkage and the second linkage about the pivotal connections.

17. The linkage of claim 16, wherein the first linkage and the second linkage each comprise an I-beam portion extending between the first coupling bracket and the second coupling bracket.

18. The linkage of claim 17, wherein one or both of the first linkage and the second linkage comprises a biasing element engagement tab extending from the respective I-beam portion and configured for engagement with one or both of the first end and the second end of the biasing element.

19. The linkage of claim 18, wherein one or both of the first linkage and the second linkage comprises a pivot portion coupled with the respective I-beam portion and configured for rotational engagement with the biasing element mount.

20. The linkage of claim 16, wherein the first coupling bracket or the second coupling bracket is Y-shaped.

* * * * *